US012169092B2

(12) United States Patent
Park et al.

(10) Patent No.: US 12,169,092 B2
(45) Date of Patent: Dec. 17, 2024

(54) REFRIGERATOR

(71) Applicant: LG Electronics Inc., Seoul (KR)

(72) Inventors: Ki Hyun Park, Seoul (KR); Gi Young Kim, Seoul (KR); Seung-Jin Oh, Seoul (KR); Chang Woan Yang, Seoul (KR); Jeong Wook Kang, Seoul (KR); Deok Eun Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/233,963

(22) Filed: Aug. 15, 2023

(65) Prior Publication Data

US 2023/0384023 A1 Nov. 30, 2023

Related U.S. Application Data

(63) Continuation of application No. 17/097,634, filed on Nov. 13, 2020, now Pat. No. 11,768,028.

(30) Foreign Application Priority Data

Nov. 13, 2019 (KR) ........................ 10-2019-0145458
Nov. 13, 2019 (KR) ........................ 10-2019-0145459
Nov. 13, 2019 (KR) ........................ 10-2019-0145460

(51) Int. Cl.
*F25D 23/02* (2006.01)
*E05F 15/619* (2015.01)
(Continued)

(52) U.S. Cl.
CPC .......... *F25D 23/028* (2013.01); *E05F 15/619* (2015.01); *F25D 23/006* (2013.01);
(Continued)

(58) Field of Classification Search
CPC ............... F25D 23/028; F25D 2201/14; F25D 2327/00; F25D 2400/361; F25D 2700/04;
(Continued)

(56) References Cited

U.S. PATENT DOCUMENTS 3,012,837 A * 12/1961 Morrissey, Jr. ..... E05B 17/0033 49/276
5,117,523 A * 6/1992 Jacobus ................ F25D 23/006 62/428
(Continued)

FOREIGN PATENT DOCUMENTS

CN 104328971 2/2015
CN 107062756 8/2017
(Continued)

OTHER PUBLICATIONS

WO2017148677 translation (Year: 2017).*
(Continued)

*Primary Examiner* — Hiwot E Tefera
(74) *Attorney, Agent, or Firm* — Fish & Richardson P.C.

(57) ABSTRACT

A refrigerator includes a door frame and a perimetric surface of an insulation door panel of a panel unit that are spaced apart from each other. A component receiving groove is provided between the door frame and the perimetric surface of the insulation door panel, so that an operation module is received in the component receiving groove. When the operation module is received in the component receiving groove, at least of a part of the operation module is arranged to face a front surface of the panel unit through a bezel portion constituting the front surface of the panel unit. Therefore, a space for installing the operation module such as a detection sensor or a touch sensor is provided to be sufficiently wide along an edge of a door.

19 Claims, 24 Drawing Sheets

(51) Int. Cl.
*F25D 23/00* (2006.01)
*F25D 29/00* (2006.01)

(52) U.S. Cl.
CPC ...... *F25D 29/005* (2013.01); *F25D 2323/024* (2013.01); *F25D 2327/00* (2013.01); *F25D 2700/04* (2013.01)

(58) Field of Classification Search
CPC ...... F25D 23/02; F25D 29/003; F25D 29/005; F25D 27/005; F25D 2323/024; F25D 2323/002; F25D 23/003; F25D 23/006; E05B 17/0033; E05B 17/0029; E05F 15/619; E05F 15/616; E05F 15/614
See application file for complete search history.

(56) References Cited

U.S. PATENT DOCUMENTS

| | | | | |
|---|---|---|---|---|
| 11,768,028 | B2 | 9/2023 | Park et al. | |
| 2009/0272142 | A1* | 11/2009 | Kempte | F25D 23/126 62/449 |
| 2016/0281408 | A1* | 9/2016 | Kempfle | F25D 23/065 |
| 2017/0321953 | A1 | 11/2017 | Kempfle | |
| 2018/0038637 | A1* | 2/2018 | Kim | F25D 23/028 |
| 2018/0149407 | A1* | 5/2018 | Akalan | F25D 23/003 |
| 2019/0049169 | A1* | 2/2019 | Ciyanoglu | F25D 23/028 |
| 2020/0095818 | A1* | 3/2020 | Lee | F25D 23/028 |

FOREIGN PATENT DOCUMENTS

| | | | | | |
|---|---|---|---|---|---|
| EP | 3822563 | A1 | | 5/2021 | |
| EP | 4336132 | | | 3/2024 | |
| JP | 2009-008279 | | | 1/2009 | |
| JP | 4966168 | B2 | | 7/2012 | |
| JP | 2016075451 | | * | 5/2016 | F25D 23/02 |
| WO | WO 2017/148677 | | | 9/2017 | |
| WO | WO-2018199600 | A1 | * | 11/2018 | E05F 15/614 |

OTHER PUBLICATIONS

JP2016075451 translation (Year: 2016).*
Office Action in Australian Appln. No. 2023200070, mailed on May 1, 2024, 3 pages.
Office Action in Australian Appln. No. 2023200070, mailed on Nov. 8, 2023, 5 pages.
Extended European Search Report in European Appln. No. 23219422.5, mailed on Mar. 26, 2024, 7 pages.

* cited by examiner

REFRIGERATOR

CROSS REFERENCE TO RELATED APPLICATIONS

The present application is a continuation of U.S. Application Ser. No. 17/097,634, filed on Nov. 13, 2020, which claims priority to Korean Patent Application Nos. 10-2019-0145458, No. 10-2019-0145459, and No. 10-2019-0145460, each filed on Nov. 13, 2019, the entire contents of which are incorporated herein for all purposes by this reference.

TECHNICAL FIELD

The present disclosure relates generally to a refrigerator and, more particularly, to a refrigerator that is capable of automatically opening a door in which electronic components such as a touch button are embedded.

BACKGROUND

In general, a refrigerator is a home appliance that stores foods at a low temperature in an internal storage space shielded by a door. In order to achieve the function, the refrigerator is configured to cool the inside of the storage space by using cool air generated through heat exchange with refrigerant circulated through a refrigeration cycle in the refrigerator, so that the foods may be stored in the optimal condition.

In recent years, built-in type refrigerators have been used, and the built-in type refrigerators may be applied to a kitchen island that is widely used in recent years. The island-type kitchen furniture is highly convenient because the furniture is a workspace installed independently from a sink, but the overall height thereof is low, so the process of holding and opening the door of the refrigerator may be inconvenient.

A device for automatically opening the door may be installed, but since the overall height of the island-type kitchen furniture is low, it is difficult to secure enough space for installing a sensor and an actuator for automatically opening the door.

In addition, in the built-in type refrigerator, an exposed portion of the door is only a front surface of the door, so if electric circuit components, such as LED lamps, switches for automatically opening door, etc., are installed in the front surface of the door, a transparent portion (window portion) of the front surface to expose a storage space of the refrigerator should be reduced. In this case, the space for installing the electric circuit components occupies a portion of a limited front surface of the door, thereby deteriorating the aesthetics of the refrigerator.

In recent years, a refrigerator door in which a foaming agent such as polyurethane is filled for thermal insulation performance is generally used. However, the refrigerator door capable of observing the inside of the refrigerator has a foaming space and a foaming passage relatively smaller than a general refrigerator door, so it is difficult to fill the foaming agent. This is because the foaming space and the foaming passage are limited to the entire door excluding the window portion, that is, to a door frame, since the foaming space should be formed at an outer portion of the door by avoiding a glass portion capable of observing the inside of the refrigerator.

Although the foaming space may be sufficiently secured by increasing the thickness of the door frame, but when the foaming space is formed by the above structure, a window of the door may be relatively small, or the door frame may be exposed through the transparent glass, thereby deteriorating the aesthetics of the refrigerator. For example, in Korean Patent Application Publication No. 10-2018-0078334, reducing foaming resistance when foaming agent is foamed in a temporary assembled door is proposed. In order to secure a foaming space and a passage, a door frame is thick and an area of the window is relatively small.

In addition, when the foaming agent is filled in a door frame, it is difficult to secure a space for installing electric circuit components such as a touch button in the door frame. The electric circuit components may be installed inside the foaming space and fixed with the foaming agent, but in this case, maintenance of the electric circuit components may be impossible. In Korean Patent Application Publication No. 10-2017-0006542, configuring a window only on a part of a door frame to expose a display portion and filling the foaming agent in the rest of the frame to separate the display are disclosed. However, in this case, only the display portion may be seen, but the rest of the door is filled with the foaming agent, so the inside of the refrigerator cannot be observed.

SUMMARY

Accordingly, the present disclosure has been made keeping in mind the above problems occurring in the related art, and the present disclosure is intended to enable a user to easily open a door of a built-in type refrigerator in which an overall height is low and a portion exposed to the outside occupies only a front surface of the door thereof.

Another objective of the present disclosure is to provide a refrigerator, wherein a door frame of a refrigerator door has enough space to install an operation module such as a sensor or a touch button and the installed operation module is easily disassembled for maintenance.

A further objective of the present disclosure is to provide a refrigerator, wherein a transparent door panel is applied to a refrigerator door so that the inside of the refrigerator is visible, and a door frame surrounding the door panel is formed to be thin so that an area through which the inside of the refrigerator is seen is increased.

A further objective of the present disclosure is to provide a refrigerator, wherein a door opening device is installed, but a cabinet or a door of the refrigerator is not increased in size.

In order to achieve the above objective, according to one aspect of the present disclosure, there is provided a refrigerator. The refrigerator of the present disclosure may include: a cabinet having a storage space; and a door assembly rotatably coupled to the cabinet and configured to selectively shield the storage space. An operation module may be arranged on an upper portion of the door assembly, and may have a detection device that may be configured to detect approach of a user and an input device that may be configured to emit light so as to allow the user to recognize an input position when the approach of the user is detected by the detection device. As described above, when the operation module is arranged on the upper portion of the door assembly, the user accessibility may be improved even when the operation module is applied to a small refrigerator.

A door opening device may be arranged on a lower portion of the cabinet. The door opening device may be configured to push the door assembly in a direction away from the cabinet while partially protruding toward a rear surface of the door assembly in response to a signal input through the input device. As described above, when the door opening device is arranged on the lower portion of the cabinet, the door opening device may protrude from a position far from the user's view and the aesthetics of the refrigerator may be enhanced. In addition, the operation module and the door opening device may be respectively installed on the upper portion and the lower portion of the refrigerator, so that it is possible to prevent interference between components in the small refrigerator.

The door opening device may be arranged on a lower center portion of the cabinet. Accordingly, regardless of a position of a hinge of the door assembly, the door opening device may open the door assembly.

Furthermore, the door assembly may include a panel unit having a bezel portion and a door frame. The operation module may be arranged in a component receiving groove provided between a surface of the door frame and a rear surface of the bezel portion. As described above, when the operation module is installed in the bezel portion, there is no need to narrow a window portion, and the operation module may not be normally exposed to the outside by forming the bezel portion to be translucent or opaque, so that the aesthetics of the door may be enhanced.

The door frame may have a hook that may protrude toward the component receiving groove, and the operation module may be in close contact with the rear surface of the bezel portion by the hook The operation module may be arranged in a component receiving groove that may be positioned on the rear surface of the door assembly at the same height as the operation module, and the detection device and the input device may be arranged to be spaced apart from each other. As described above, the installation and maintenance performance of the operation module may be improved.

The detection device may be arranged at a center of the upper portion of the door assembly, and the input device may be arranged on a side opposite to an end where a hinge is arranged on the upper portion of the door assembly. As described above, the detection performance of the detection device may be improved and the user manipulating the input device may naturally stand at an entrance side where the door assembly is opened.

The input device may include a touch sensor and a light emitting portion positioned adjacent to the touch sensor. When the detection device detects the user in front of the door assembly, the light emitting portion may operate to allow the user to recognize a position of the input device.

A display module capable of signal input may be arranged on a front surface of the cabinet or a front surface of a barrier partitioning the storage space. The display module may receive a different-type signal input from the signal input by the operation module.

The operation module may be assembled to a component bracket that may be adjacent to the component receiving groove and removably coupled to a rear surface of the door frame. When the operation module is assembled to the component bracket, the operation module may be positioned in the component receiving groove to face the rear surface of the bezel portion.

Among several layers of door panels constituting the panel unit, a front door panel constituting a front surface of the panel unit may have a larger area than other door panels so that the bezel portion may be provided on an edge of the front door panel.

A door liner may be coupled to a rear surface of the door frame, which may corresponds to a side of the door frame opposite to a side coupled to the bezel portion. The door liner may shield the component receiving groove.

The component receiving groove may be positioned between an upper surface of the insulation door panel, the rear surface of the bezel portion, and a lower surface of the door frame.

The door opening device may be arranged in an installation space that may be depressed from the lower portion of the cabinet toward the storage space. Accordingly, even when the door opening device is installed, the overall volume of the refrigerator including the cabinet may not be increased.

The installation space may be positioned in a cover plate constituting a lower surface of the cabinet, and a machine room may be arranged under the cover plate.

A front entrance of the installation space may be open toward the rear surface of the door assembly, and the installation space may also be open toward the machine room. Accordingly, the accessibility to the installation space may be improved.

The cabinet may include: an outer casing constituting a surface of the cabinet; and an inner casing constituting an insulation space between the outer casing and the inner casing. The cover plate may constitute a lower surface of the outer casing, and the installation space may be formed by depressing a portion of the cover plate toward the insulation space.

A direction (X) in which a plurality of reduction gears constituting a gear assembly of the door opening device may extend from a driving motor of the door opening device and a direction (Y) in which a plurality of spacer gears constituting the gear assembly of the door opening device may extend from the reduction gears may be configured differently from each other. Accordingly, an area occupied by the door opening device in the refrigerator may be reduced.

The cover plate may be installed between an upper portion of the machine room assembly and the lower portion of the cabinet to cover the machine room, and the door opening device may be installed in the installation space that is depressed from a lower surface of the cover plate toward the lower portion of the cabinet. The periphery of the cover plate, which surrounds the door opening device, may be filled with a foaming agent to provide the insulation portion. The insulation portion may serve as a sound insulation material that blocks noise from the motor and the gear in the door opening device.

As described above, the refrigerator according to the present disclosure has the following effects. The door of the present disclosure may have the operation module such as the touch sensor, and the cabinet may have the door opening device (actuator). When the operation module is installed in the door and the door opening device is installed in the cabinet, the door of the refrigerator that is low in height and has a front surface configured only of the door may be automatically opened.

In particular, (i) the operation module is arranged on the upper portion of the door assembly, so that the user accessibility may be increased even when the operation module is applied to a small refrigerator, (ii) the door opening device is installed on the lower portion of the cabinet, so that the door opening device may protrude from a position far from the user's view and the aesthetics of the refrigerator may be enhanced.

In addition, the operation module and the door opening device are respectively installed on the upper portion and the lower portion of the refrigerator, so that it is possible to prevent interference between components in the small refrigerator.

In the refrigerator of the present disclosure, when the detection device detecting a user's approach detects a user's approach, the surrounding of the input device is illuminated so that the user may recognize an input position. Accordingly, the aesthetics of the refrigerator may be enhanced because the input device and the like are not normally exposed, and convenience of operation for automatically opening the door may be improved.

In the door assembly, the door frame surrounds and supports the perimetric surface of the panel unit including the several layers of glass, wherein the door frame is formed in a single frame by connecting a plurality of frames to each other by the corner brackets. In other words, since only the door frame supports the panel unit without adding a separate outer frame, a support structure of the door may be formed thin, and a portion (window portion) through which the inside of the refrigerator is seen over the panel unit may be secured to be relatively wide. Accordingly, even when the door is not opened, the storage space of the refrigerator may be easily checked and a position of the stored food may be easily checked, thereby improving usability.

Since the amount of the foaming agent that is used in the manufacturing process of the door assembly is reduced, time and cost for manufacturing the door assembly may be reduced.

In the present disclosure, the perimetric surface of the panel unit and the door frame are spaced apart from each other and the component receiving groove is provided in a gap therebetween. Accordingly, a space for installing the operation module, such as a detection sensor or the touch sensor, is sufficiently provided along an edge of the door, so that a variety of the operation module may be installed without covering the window portion of the door.

The component receiving groove is provided in the rear side of the bezel portion of the front door panel that is arranged on the front surface of the panel unit. Accordingly, when the bezel portion may be formed translucent, the assembled portion, such as the door frame at the rear side, may be covered, thereby enhancing the aesthetics of the door assembly, and light emitted from the LED lamp positioned at the rear surface of the bezel portion may be transmitted to the outside, thereby improving visibility, and the bezel portion may be used as a part of the display portion, thereby increasing utilization.

Among each frame constituting the door frame, the side frames supporting the side surfaces of the panel unit are made of a metal material to firmly support the panel unit. The upper and lower frames supporting the upper portion and the lower portion of the panel unit are made of a synthetic resin material to reduce the overall weight thereof, so that it is possible to reduce the weight of the door assembly.

When the upper and lower frames supporting the upper portion and the lower portion of the panel unit are made of the synthetic resin material, more complex shapes thereof may be implemented. Accordingly, the receiving structure for installing the operation module, such as the sensors, the touch button, etc., may be easily implemented, so that various components may be embedded at various positions in the door assembly thus the door assembly may have various functions.

In the present disclosure, since the foaming agent is not filled in the door assembly, both the installation and separation of the components, such as the sensors or the touch button, may be easily performed. In particular, when the door liner is removed from the door assembly, the component receiving groove in which the components are received is exposed to the outside, so that the accessibility of the user may be excellent and the maintenance of the components may be improved.

In the present disclosure, the door opening device is installed in the lower portion of the door assembly, and the door opening device may be controlled by being connected to the input device installed in the upper portion of the door assembly. In other words, the user can automatically open the door assembly by manipulating the input device. Accordingly, even when only glass is seen at the front surface of the door, the user can easily open the door, thereby enhancing the usability of the door applied in the built-in type refrigerator, more precisely, in the island-type kitchen furniture.

Even when the user holds an object in both hands, the user can touch the input device to automatically open the door, so that the usability of the refrigerator may be improved. In particular, the door opening device may allow the door to be opened enough to putting the user's body, for example, an elbow, the door may be easily further opened by putting a part of the body other than both hands into the opened gap. Accordingly, the door may be completely opened without using both hands, so that the usability of the refrigerator may be improved.

In the present disclosure, the detection device and the input device are installed in the door. The detection device recognizes the user's approach and shows the position of the input device with the LED lamp, and the user can touch the touch sensor around the LED lamp to operate the door opening device. Accordingly, the door opening device may be precisely operated even in dark environment, so that the usability of the refrigerator may be improved.

The refrigerator of the present disclosure may have the door opening device that automatically opens the door. The door opening device is installed in the cabinet-side, not the door, in particular, in the lower center portion of the cabinet. Accordingly, even when the hinge of the door is installed in either side of the left side or the right side of the cabinet, the door opening device may open the door. Therefore, the door can be commonly used and the manufacturing cost of the door may be reduced.

In the present disclosure, the door opening device is installed in the lower portion of the cabinet adjacent to a machine room, more precisely, in the installation space that is depressed from the cover plate covering the upper portion of the machine room toward the insulation portion. Accordingly, even when the door opening device is installed in the refrigerator, a total volume of the refrigerator including the cabinet may not be increased and the size of the refrigerator may be reduced.

In particular, the periphery of the cover plate surrounding the door opening device may be filled with the foaming agent to form the insulation portion. The insulation portion serves as a sound insulation material that blocks noise from the motor and the gear in the door opening device. Accordingly, the noise generated during the operation process of the door opening device may be reduced, thereby improved the quality of the refrigerator.

In addition, the cover plate serves as a lid of the door opening device and the front surface of the door opening device is shielded by the front frame. Accordingly, it is possible to efficiently prevent the noise of the door opening device from being transmitted to the outside.

In the present disclosure, the door opening device is installed adjacent to the machine room positioned in the lower portion of the cabinet, and the control module is also positioned in the machine room. Accordingly, the door opening device and the control module provided to control the door opening device are positioned adjacent to each other, so that the wire harness for connecting the door opening device to the control module is shortened, thus the installation structure in the refrigerator may be simplified.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
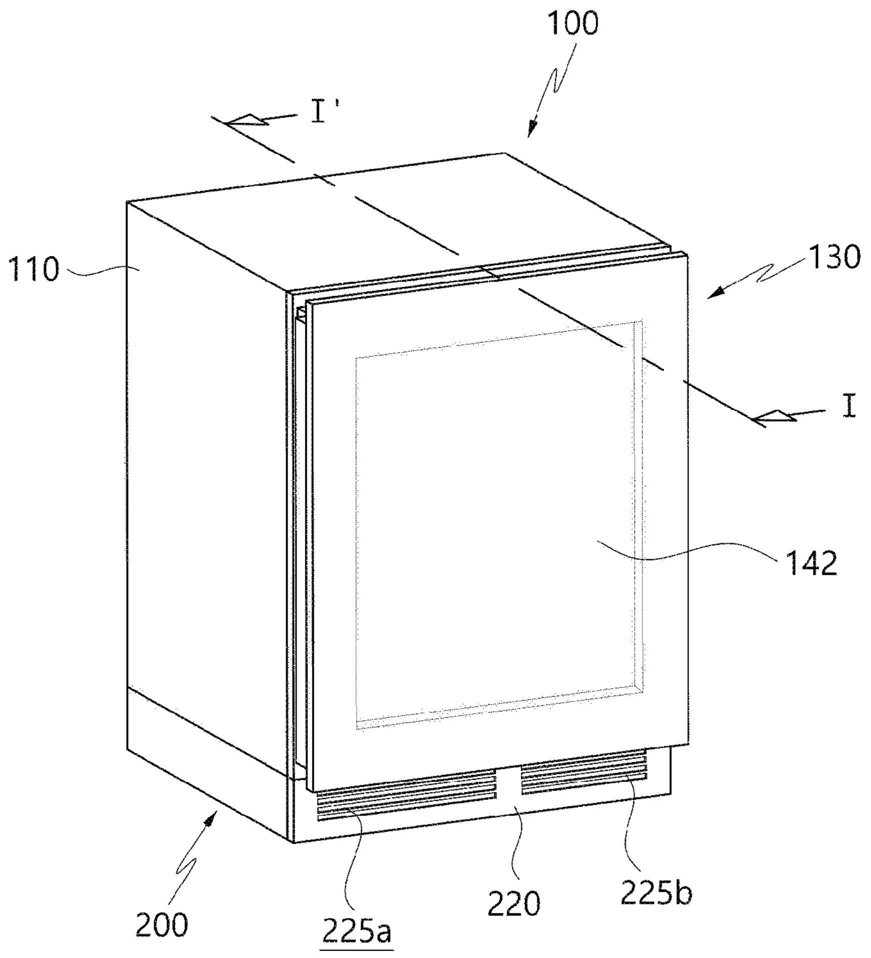
FIG. 1 is a perspective view showing an exterior of a refrigerator according to an embodiment of the present disclosure.

Hereinbelow, an embodiment of the present disclosure will be described in detail through exemplary drawings. Like reference numerals are used to identify like components throughout different drawings. Further, in the following description, if it is decided that the detailed description of known function or configuration related to the present disclosure makes the subject matter of the invention unclear, the detailed description will be omitted.

A refrigerator according to the embodiment of the present disclosure will be described with reference to the accompanying drawings. For example, a built-in type refrigerator having a door assembly will be described for an example, but the door assembly of the present disclosure may be applied to various devices having an inside storage space, such as a general refrigerator, a wine refrigerator, a kimchi refrigerator, a beverage storage, a plant cultivation apparatus, and a laundry processing apparatus.

The refrigerator of the present disclosure includes a cabinet 100, a door assembly 130, a machine room assembly, beds 300*a* to 330*d*, a barrier 400, and a grill fan module 500*a*, 500*b*. The beds 300*a* to 330*d*, the barrier 400, and the grill fan module 500*a*, 500*b* may be installed inside the cabinet 100, and the door assembly 130 may be assembled to a front surface of the cabinet 100. The machine room assembly may be assembled to a lower portion of the cabinet 100.

As shown in FIG. 1, the cabinet 100 forms the exterior of the refrigerator, and may be formed with a low overall height. The refrigerator of the embodiment is a built-in type refrigerator installed inside an island-type dining table, so the refrigerator is lower in height than a general refrigerator. Therefore, the refrigerator of the embodiment has a small internal capacity as well as a small space in which each component may be installed. Accordingly, the door assembly 130 may also have a small size, and a space for filling a foaming agent into the door assembly 130 or a space for installing the operation module may not be sufficiently secured. The above problem will be described again below.

Figure 2:
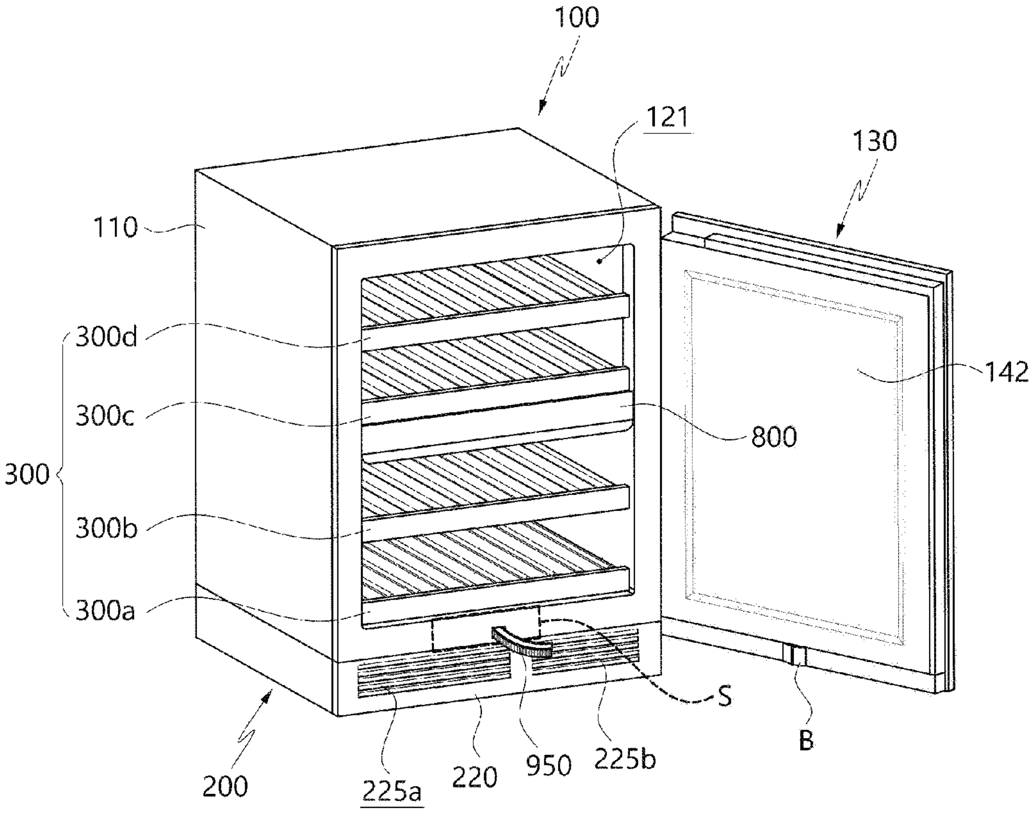
FIG. 2 is a perspective view showing the refrigerator in FIG. 1 with an opened door.
Figure 3:
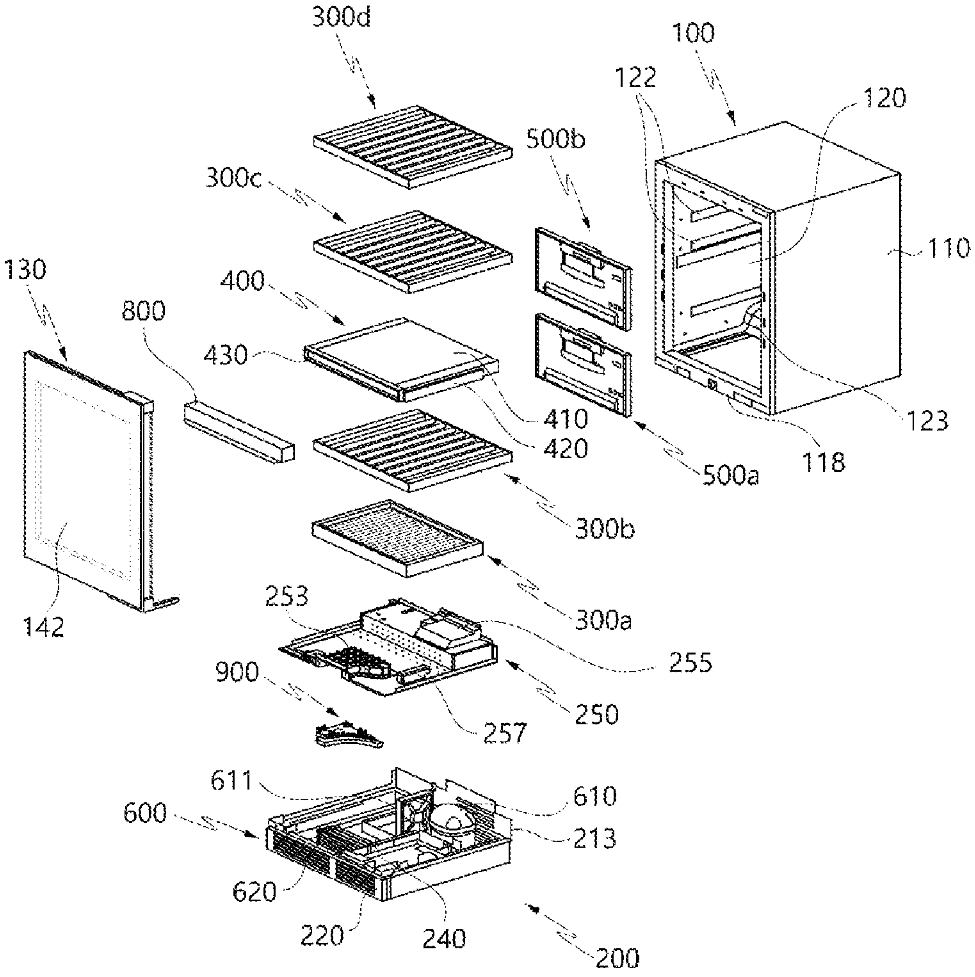
FIG. 3 is an exploded-perspective view showing disassembled components of the refrigerator according to the present disclosure.

The cabinet 100 may be formed in a tank that is open forward. The cabinet 100 may consist of a plurality of components, and includes an outer casing 110 constituting an outside wall surface of the cabinet 100 and an inner casing 120 constituting an inside wall surface thereof. As shown in FIGS. 2 and 3, the front surface of the cabinet 100 in an open state may be selectively shielded by the door assembly 130, and when the door assembly 130 is opened, a storage space 121 is opened to the front.

Figure 4:
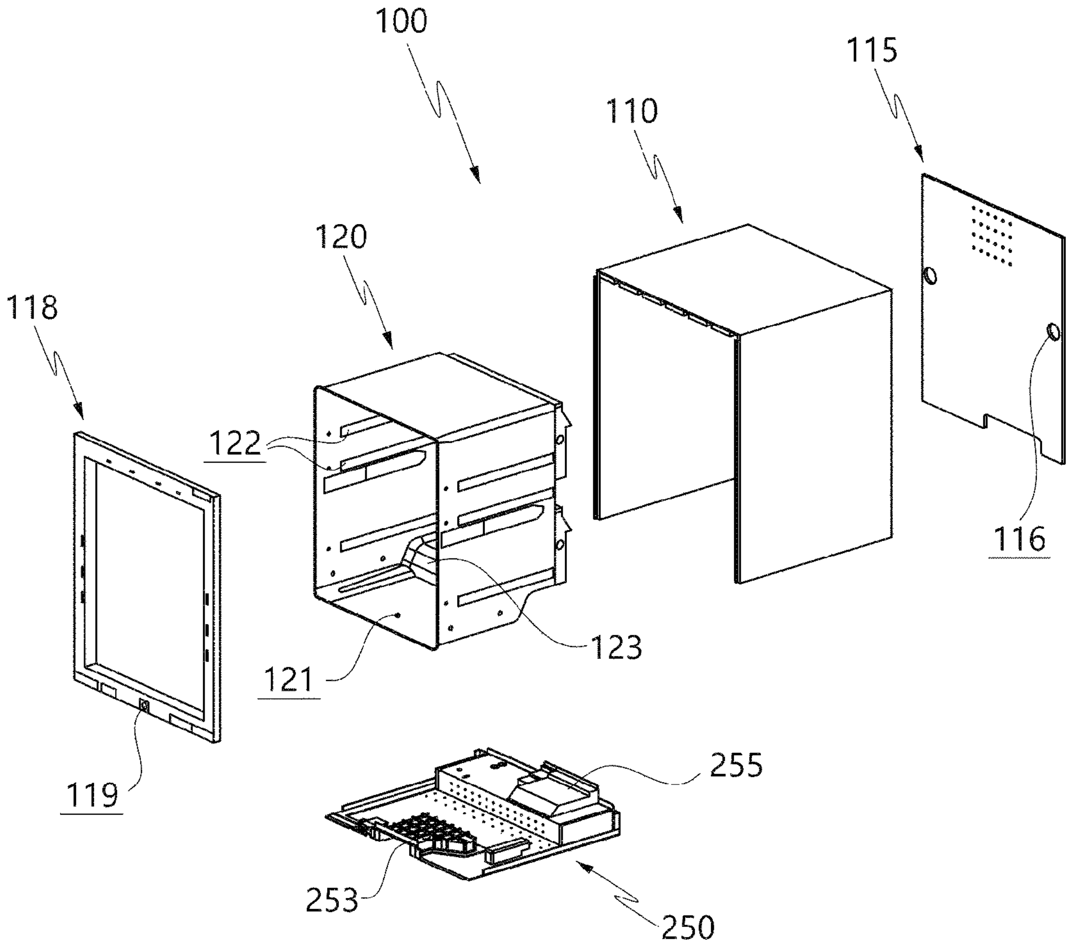
FIG. 4 is an exploded-perspective view showing components of a cabinet constituting the refrigerator according to the present disclosure.

FIG. 4 is a view showing disassembled-state components constituting the cabinet 100. As shown in FIG. 4, the outer casing 110 may have a roughly hexahedron that is open forward, rearward, and downward, and the inner casing 120 may be installed to be spaced apart from the outer casing 110 in the outer casing 110. A back plate 115 may be assembled to a rear surface of the outer casing 110, a front frame 118 may be assembled to a front surface thereof, and a cover plate 250 may be assembled to a lower surface thereof.

When the inner casing 120 is positioned in the outer casing 110 and the back plate 115, the front frame 118, and the cover plate 250 are assembled in the outer casing 110, a foam insulation material (now shown) may be filled into an insulation space between the inner casing 120 and the outer casing 110. A filling hole 116 may pierce through the back plate 115 and the foam insulation material may be injected through the filling hole 116.

For example, in the embodiment, the cover plate 250 may be the lower surface of the outer casing 110. An installation space 253 to be described below may be formed by depressing a part of the cover plate 250 toward the insulation space.

The storage space 121 may be positioned in the cabinet 100. The storage space 121 is a space for storing food, and the storage space 121 may be partitioned into a plurality of compartments by the beds 300*a* to 330*d*. Guide rails 122 are provided on inside wall surfaces of the storage space 121, and the beds 300*a* to 300*d* may be configured to move back and forth under the guidance of the guide rails 122 and to be taken from the storage space 121 in a drawer manner.

The storage space 121 may have an avoidance portion 123 at a bottom surface thereof. The avoidance portion 123 is a portion protruding upward from the bottom surface of the storage space 121, and the avoidance portion 123 may be provided to avoid interference with a compressor 610 of the machine room assembly, which will be described below. The avoidance portion 123 may allow a part of the bottom surface of the storage space 121 to have a stepped space.

The door assembly 130 may be provided in the front surface of the cabinet 100. The door assembly 130 may be provided to open and close the storage space 121 of the cabinet 100, and in the embodiment, the door assembly 130 may be configured to be rotatably opened and closed. More precisely, the door assembly 130 may be in close contact with the front frame 118 of the cabinet 100 to shield the storage space 121 or may move away from the front frame 118 by be rotated to open the storage space 121.

In other words, the refrigerator according to the embodiment of the present disclosure may achieve the closed-type storage space 121 by the door assembly 130. In particular, the closed-type storage space 121 may store foods while maintaining a predetermined temperature without loss of cool air by the grill fan module 500*a*, 500*b* and an air conditioning module 600. In the air conditioning module 600 of the embodiment, at least a part of the door assembly 130 is configured as a window portion 142 so that the storage space 121 may be checked from the air conditioning module 600.

In FIGS. 6 to 17, the structure of the door assembly 130 is shown in detail. Referring to the drawings, the structure of the door assembly 130 is described as follows. First, the door assembly 130 may have a rectangular plate structure, and a plurality of components is assembled to form the door assembly 130. In the embodiment, the door assembly 130 may be opened and closed automatically by a door opening device 900. A sensor and a button for operating the door opening device 900 may be installed on a bezel portion 143 of a front door panel 141 of the door assembly 130. For example, an input device 170 and a detection device 175 may be respectively installed in portions A and B in FIG. 6, and the portions will be described again below.

Figure 6:
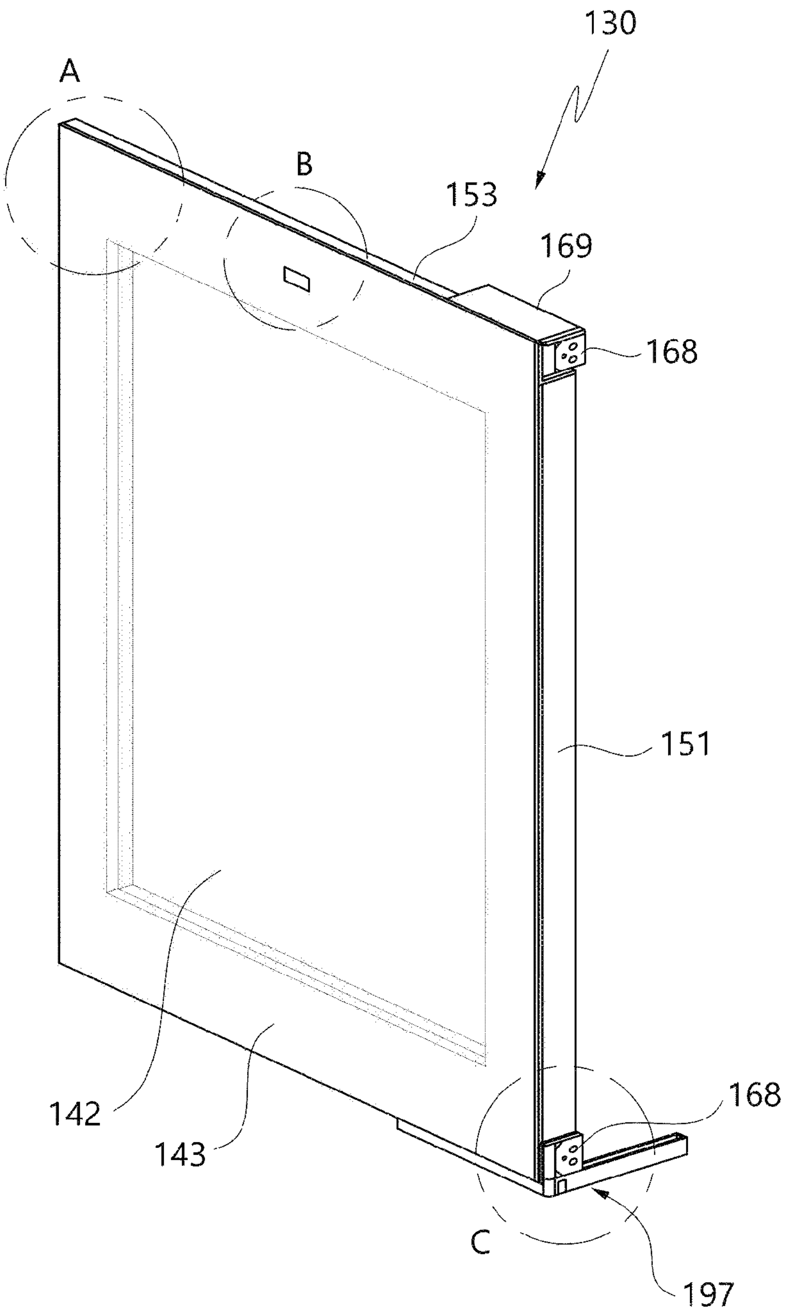
FIG. 6 is a perspective view showing a configuration of a door assembly according to an embodiment of the present disclosure.

As shown in FIG. 6, a hinge 168 may be provided at one side of the door assembly 130, more precisely, at each of an upper side surface and a lower side surface of the door assembly 130. The hinge 168 may be provided to rotatably connect the door assembly 130 to the cabinet 100, and may be assembled to a door frame 150 to be described below. In the embodiment, the hinge 168 is installed on a right side surface of the door assembly 130 on the basis of the drawing. On the contrary, the hinge 168 may be installed on a left side surface of the door assembly 130 or may be installed at a midpoint of the height of the door assembly 130 instead of the upper side and the lower side thereof.

Figure 7:
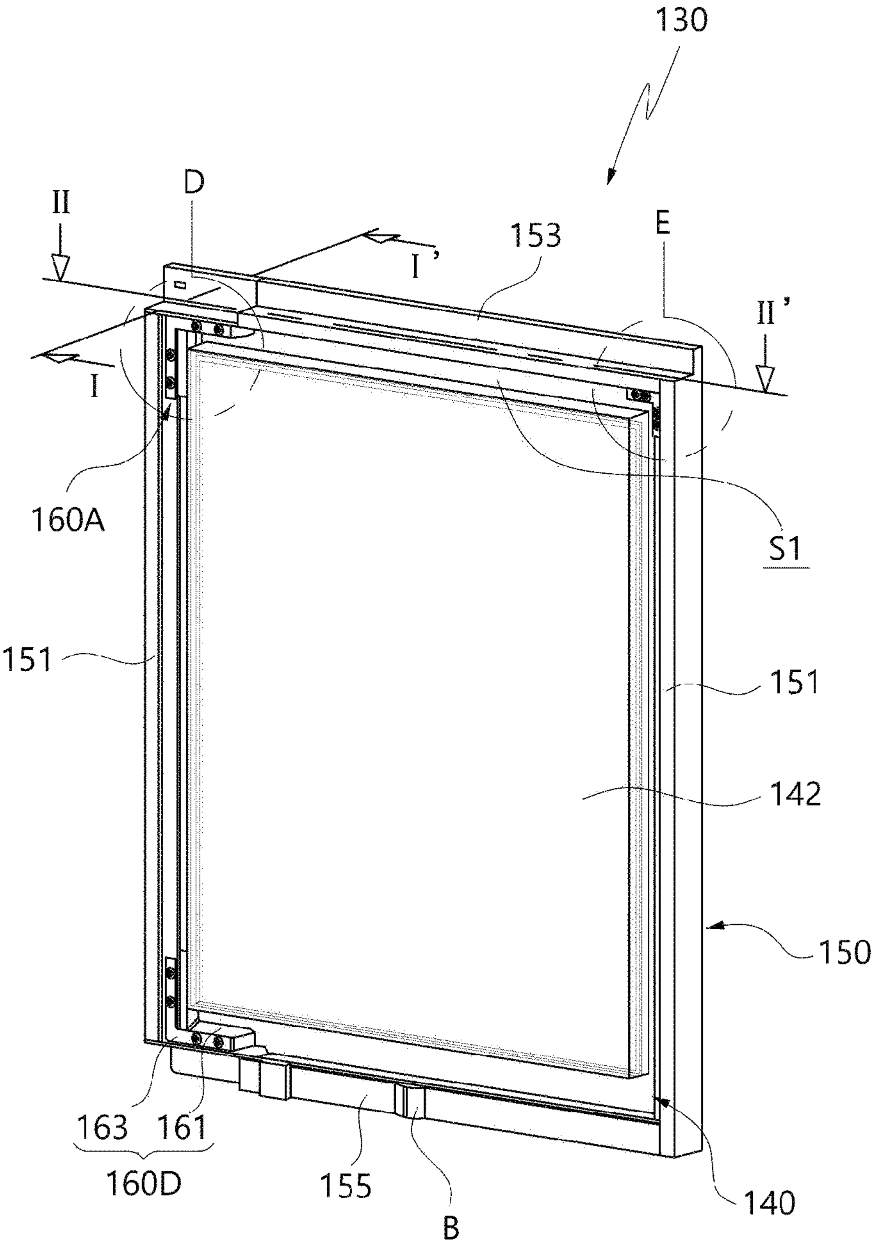
FIG. 7 is a perspective view taken from the opposite direction of a direction in FIG. 6, the view showing the door assembly according to the embodiment of the present disclosure in a state in which a door liner and a gasket are omitted.

FIG. 7 is a view showing a rear structure of the door assembly 130. In FIG. 7, a door liner 190 and a gasket 195, which will be described below, are omitted in the structure, and when the door liner 190 is removed, the door frame 150 constituting the door assembly 130 is exposed, as shown in FIG. 7. A component receiving groove S1 for installing the operation module in the door assembly 130 may be exposed through the rear of the door assembly 130.

Figure 8:
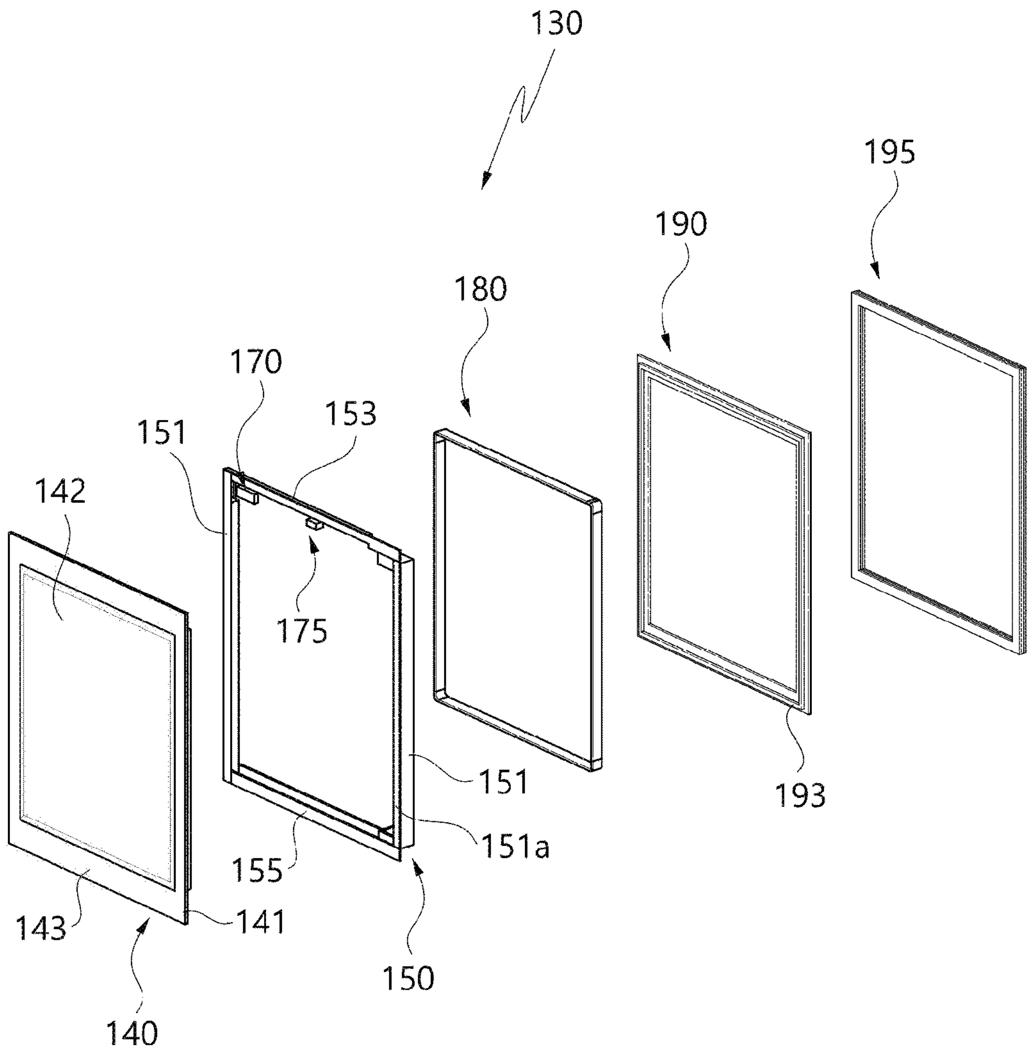
FIG. 8 is an exploded-perspective view showing components of the door assembly according to the embodiment of the present disclosure.

FIG. 8 is a view showing a disassembled state of components constituting the door assembly 130. As shown in FIG. 8, the door assembly 130 may include a panel unit 140, the door frame 150, a heater frame 180, the door liner 190, and the gasket 195. Among the components, the door frame 150 may form a basic frame supporting the door assembly 130, and may serve to connect the rest of the components to the cabinet 100.

The panel unit 140 may include several layers of panels. More precisely, the panel unit 140 may be formed by laminating a plurality of transparent panels at intervals, and the inside of the refrigerator may be selectively seen through the panel unit 140. In the embodiment, the panel unit 140 may be configured such that a several layers of glass are spaced apart from each other to form an insulation layer, but the material thereof is not necessarily limited to the glass material, and may be made of various materials through which the inside of the storage space may be seen.

Among the several of panels, the front door panel 141 constituting a front surface of the panel unit 140 may be made of a half glass material so that the inside of the refrigerator may be selectively seen, or may be made translucent by adding a film.

Figure 10:
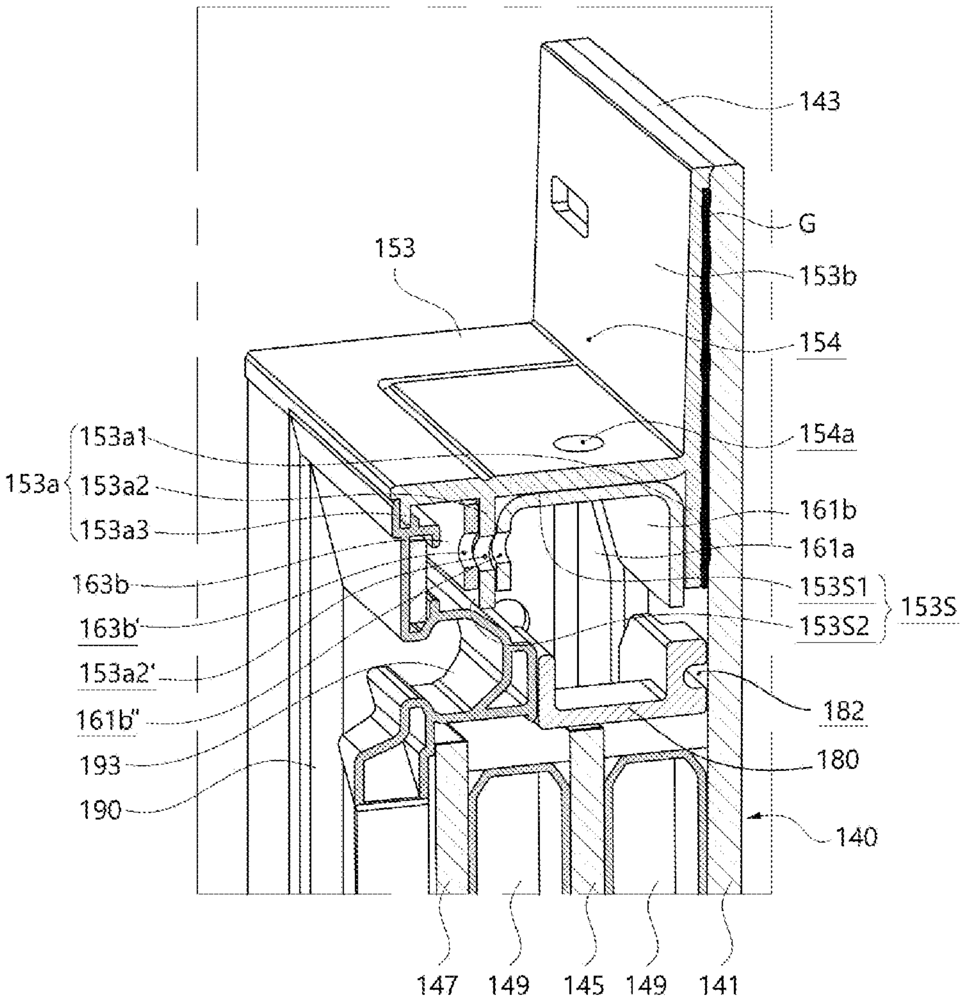
FIG. 10 is a section view taken along line I-I' in FIG. 7.
Figure 11:
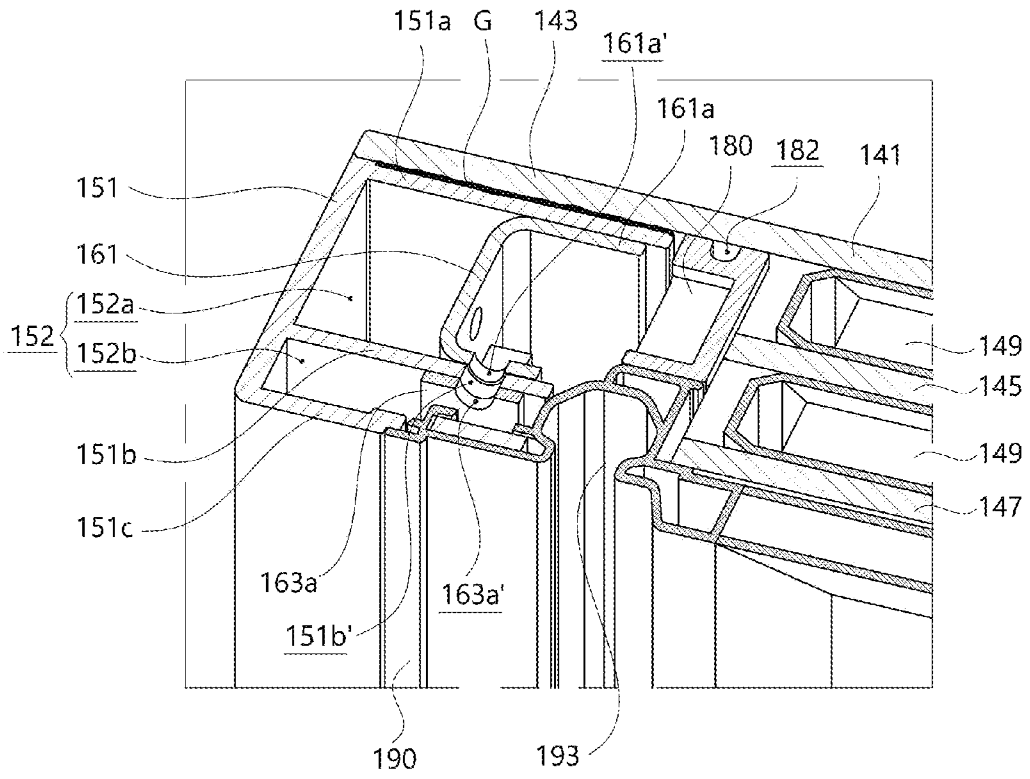
FIG. 11 is a section view taken along line in FIG. 7.

Referring to FIGS. 8, 10, and 11, the panel unit 140 may include the front door panel 141 constituting the front surface of the panel unit 140, and insulation door panels 145 and 147 laminated on a rear surface of the front door panel 141. The insulation door panels 145 and 147 may be laminated on the rear of the front door panel 141. In the embodiment, the insulation door panels 145 and 147 include two door panels, but may include one door panel or three door panels or more.

The insulation door panels 145 and 147 may be configured to include a rear door panel 147 constituting a rear surface of the panel unit 140, and an internal door panel 145 positioned between the front door panel 141 and the rear door panel 147. In the embodiment, the panel unit 140 may consist of triplex glass.

The front door panel 141, the internal door panel 145, and the rear door panel 147 may be made of glass or a material through which the inside of the cabinet may be seen, and configured to selectively expose the storage space 121. The front door panel 141, the internal door panel 145, and the rear door panel 147 may be configured to have an insulation material or an insulation structure and to prevent leakage of cool air in the inside of the cabinet.

Meanwhile, the insulation door panel 145, 147 may have a size smaller than a size of the front door panel 141. More precisely, an area of the front door panel 141 may be larger than an area of the insulation door panel 145, 147. Accordingly, an edge of the front door panel 141 may protrude more than an edge of the insulation door panel 145, 147, i.e. a perimetric surface of the insulation door panel 145, 147. The above structure may be confirmed in FIGS. 8, 10, and 11.

The protruding portion of the front door panel 141 may be called the bezel portion 143, and a portion inside the bezel portion 143 may be called the window portion 142. The window portion 142 may be a transparent portion so that the inside of the storage space 121 may be seen through the panel unit 140, but the bezel portion 143 is not necessarily transparent. In the embodiment, the bezel portion 143 is provided only in the front door panel 141, but the window portion 142 may be equally provided in the front door panel 141 as well as the insulation door panels 145 and 147.

The window portion 142 may be a transparent portion through which the storage space 121 may be seen through the panel unit 140, and may refer to a center portion of the front door panel 141, and the whole internal door panel 145 and the whole rear door panel 147. As shown in FIG. 6, the window portion 142 may be formed in a shape surrounded by the bezel portion 143. The door frame 150 to be described below may be installed on a rear surface of the bezel portion 143, and the operation module may be positioned therein. The above structure will be described again below.

A spacer 149 may be inserted between the several layers of glass. The spacer 149 may be provided to maintain a gap between the glasses. The glasses and a plurality of spacers 149 may be attached to each other by an adhesive, and sealant may be applied to maintain the airtight between the front door panel 141, the internal door panel 145, and the rear door panel 147.

A low-emissivity coating layer may be formed on a rear surface of the internal door panel 145 to reduce heat transmission into the storage space by radiation. Glass on which the low-emissivity coating layer is formed is called low-ε glass, and the low-emissivity coating layer may be formed by depositing on a surface of glass by sputtering or the like. Closed spaces between the front door panel 141—the internal door panel 145—the rear door panel 147, which are formed as described above, may be formed in a vacuum state to be insulated.

When necessary, inert gas such as argon gas for insulation may be filled in the closed spaces between the front door panel 141—the internal door panel 145—and the rear door panel 147. The inert gas has better thermal insulation property than general air.

Figure 9:
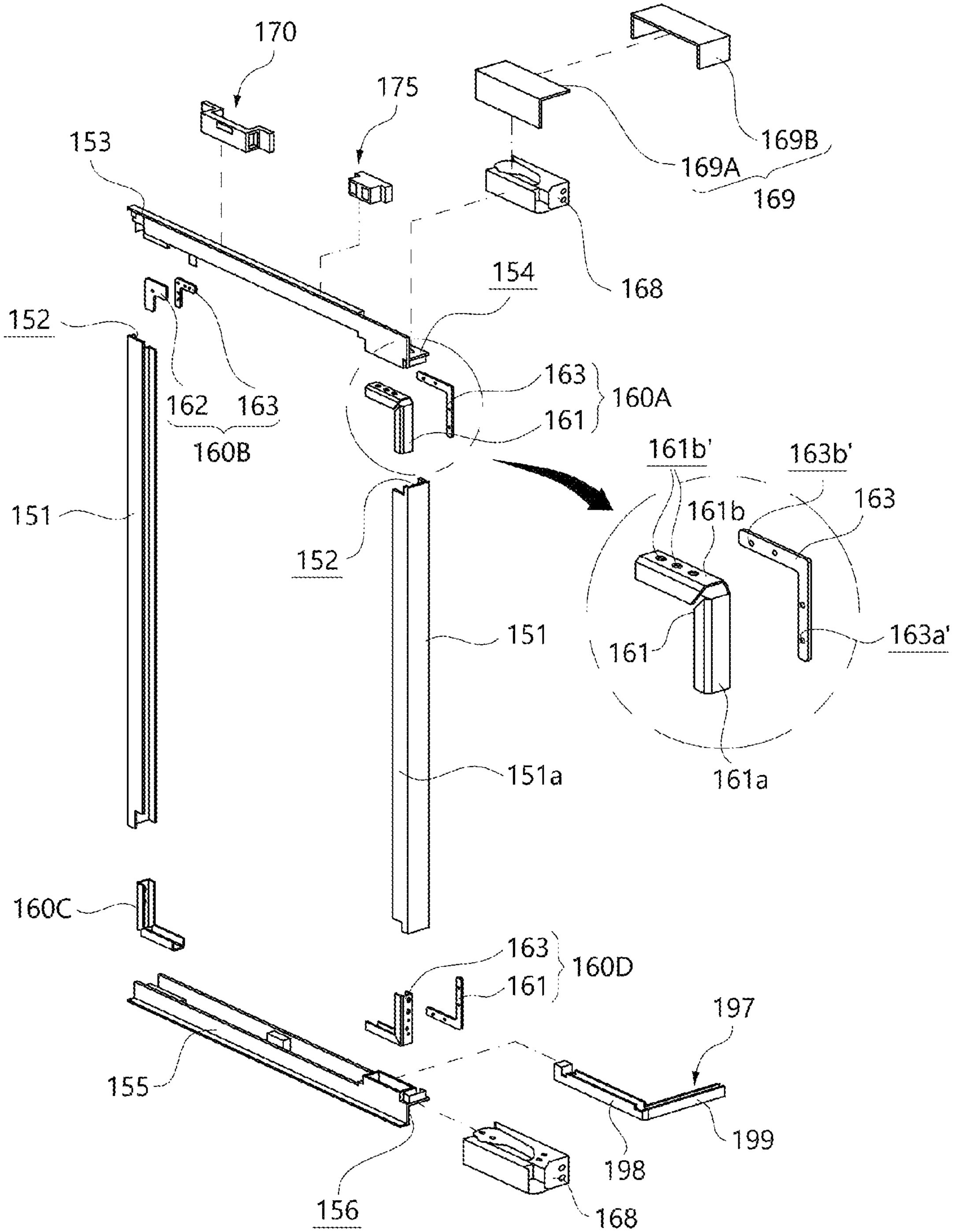
FIG. 9 is an exploded-perspective view showing a configuration of a door frame constituting the door assembly according to the embodiment of the present disclosure.

Hereinbelow, the configuration of the door frame 150 will be described with reference to FIGS. 9 to 13. The door frame 150 may be a portion forming a frame of the door assembly 130, and may be formed in a rectangular frame. The door frame 150 may be formed in a single frame by assembling a plurality of components with each other, and four frames may be connected to each other by corner brackets 160A to 160D, as shown in FIG. 9.

When the door frame 150 is assembled to the panel unit 140, an edge surface of the door frame 150 to may make a surface continuous with an edge surface of the front door panel 141 constituting the panel unit 140. In other words, since the edge surface of the door frame 150 protrudes to the same level as the edge surface of the front door panel 141, the edge surfaces of the door frame 150 and the front door panel 141 are continuous. The above structure may make the exterior of the door assembly 130 look more uniform.

The door frame 150 may include four frames. A pair of side frames 151 surrounding opposite side surfaces of the panel unit 140, an upper frame 153 surrounding an upper surface of the panel unit 140, and a lower frame 155 surrounding a lower surface of the panel unit 140 may constitute the door frame 150. The four frames may have elongated bar shapes that extend in respective directions.

More precisely, the door frame 150 may be assembled to the rear surface of the bezel portion 143, the side frames 151 may respectively surround opposite side surfaces of the window portion 142, the upper frame 153 may connect upper portions of the pair of side frames 151 to each other and surround an upper surface of the window portion 142, and the lower frame 155 may connect lower portions of the pair of side frames 151 to each other and surround a lower surface of the window portion 142.

The corner brackets 160A to 160D may be provided in four corners of the door frame 150 and connect the frames to each other. The corner brackets 160A to 160D may be respectively provided in the four corners of the door frame 150, and be divided into a first corner bracket 160A, a second corner bracket 160B, a third corner bracket 160C, and the fourth corner bracket 160D for convenience of description. The corner brackets 160A to 160D may have different structures from each other. For example, a main bracket 161 constituting the first corner bracket 160A may have a '⊂'-shaped cross section, whereas a main bracket 162 constituting the second corner bracket 160B may have a simple linear cross section.

The structure of the side frames 151 will be described in detail. Since the pair of the side frames 151 may have the same structures as each other, the pair of the side frames 151 will be described on the basis of a right side frame 151 in FIG. 9. The side frame 151 may extend to be elongated in one direction, and may be made of a metal material. The side frame 151 may be preferably made of a solid material because the side frame supports the long side of the panel unit 140, that is, a side surface of thereof. In the embodiment, the side frame 151 may be formed by compressing an aluminum material.

The side frame 151 not only extends in one direction, but also has open coupling spaces 152 into which at least a part of the first corner bracket 160A and at least a part of the fourth corner bracket 160D are respectively inserted in an inside portion facing a side surface of the window portion 142 of the panel unit 140. The coupling spaces 152 may allow coupling between the side frame 151 and the first corner bracket 160A and coupling between the side frame 151 and the fourth corner bracket 160D to be firm, and may prevent the first corner bracket 160A and the fourth corner bracket 160D from being exposed to the outside or a thickness of the door frame 150 from thickening.

In FIG. 11, the side frame 151 may have the coupling spaces 152, and the coupling spaces 152 may include a first coupling space 152*a* and a second coupling space 152*b*. More precisely, the side frames 151 may include a plurality of side coupling plates 151*a* to 151*c*, and the first coupling space 152*a* and the second coupling space 152*b* may be respectively positioned in intervals between the side coupling plates 151*a* to 151*c*.

A portion of the main bracket 161 and a portion of a support bracket 163 that constitute the first corner bracket 160A may be respectively inserted into the first coupling space 152*a* and the second coupling space 152*b*. The rest of the main bracket 161 and the rest of the support bracket 163 constituting the first corner bracket 160A may be respectively inserted into assembly spaces 153S of assembly coupling plates 153*a*1 to 153*a*3 to be described below. Therefore, the side frame 151 and the upper frame 153 may be connected to each other.

The side frame 151 may have side coupling plates 151*a* to 151*c* that protrude toward the side surface of the window portion 142 of the panel unit 140 (side surfaces of the internal door panel 145 and the rear door panel 147 on the basis of FIG. 11). The side coupling plates 151*a* to 151*c* may include the first side coupling plate 151*a*, a second side coupling plate 151*b*, and a third side coupling plate 151*c*. The first side coupling plate 151*a*, the second side coupling plate 151*b*, and the third side coupling plate 151*c* may extend in parallel to each other and roughly form an 'E' shape together, and protruding lengths thereof may be different from each other. In the embodiment, the first side coupling plate 151*a* is the longest and the third side coupling plate 151*c* is the shortest.

The first side coupling plate 151*a* may be in close contact with the rear surface of the front door panel 141 constituting the front surface of the panel unit 140. As shown in FIG. 11, a lower surface of the first side coupling plate 151*a* and the rear surface of the front door panel 141, more precisely, the rear surface of the bezel portion 143, may be in close contact with each other, and an adhesive surface G may be provided between the lower surface of the first side coupling plate 151*a* and the rear surface of the bezel portion 143. As described above, since a front surface of the first side coupling plate 151*a* is coupled to the rear surface of the bezel portion 143, an area of the first side coupling plate 151*a* may be formed to be larger than areas of the second side coupling plate 151*b* and the third side coupling plate 151*c* for stable coupling.

The adhesive surface G may be provided to combine the rear surface of the bezel portion 143 with the front surface of the first side coupling plate 151*a*. In the embodiment, a double-sided tape may be attached to the adhesive surface G. Instead of the double-sided tape, adhesive may be provided on the adhesive surface G. Alternatively, the front door panel 141 and the bezel portion 143 may be connected to each other by separate fasteners such as bolts.

The second side coupling plate 151*b* may be spaced apart from the first side coupling plate 151*a*, and the first coupling space 152*a* in which a first bracket body 161*a* of the main bracket 161 is inserted may be positioned between the second side coupling plate 151*b* and the first side coupling plate 151*a*. A width of the first coupling space 152*a* may be equal to or larger than a thickness of the first bracket body 161*a*, but the width of the first coupling space 152*a* may be preferably equal to the thickness of the first bracket body 161*a*, so that opposite side surfaces of the first bracket body 161*a* may be in contact with the first side coupling plate 151*a* and the second side coupling plate 151*b*.

The third side coupling plate 151*c* may be provided on the opposite side to the first side coupling plate 151*a* with the second side coupling plate 151*b* positioned between the third side coupling plate 151*c* and the first side coupling plate 151*a*. The second coupling space 152*b* in which the support bracket 163 may be inserted may be positioned between the third side coupling plate 151*c* and the second side coupling plate 151*b*. The third side coupling plate 151*c* may extend by a length relatively shorter than a length of the second side coupling plate 151*b*, and a lower end of third side coupling plate 151*c* may fix the door liner 190.

As shown in FIG. 11, the support bracket 163 constituting the first corner bracket 160A may be inserted in the second coupling space 152*b* and one surface of a first support body 163*a* of the support bracket 163 may be in close contact with the second side coupling plate 151*b*. Since a thickness of the support bracket 163 is less than a width of the second coupling space 152*b*, an empty space may be provided between the opposite surface of the support bracket 163 and the third side coupling plate 151*c*. Therefore, since the opposite surfaces of the second side coupling plate 151*b* are in close contact with one surface of the first bracket body 161*a* and the support bracket 163, so that the second side coupling plate 151*b* may be fastened with the first bracket body 161*a* and the support bracket 163 by one fastener. For fastening, a first fastening hole 151*b*' may be formed by piercing through the second side coupling plate 151*b*.

Next, the upper frame 153 and the lower frame 155 will be described. The upper frame 153 and the lower frame 155 may be positioned opposite to each other with the pair of side frames 151 positioned therebetween. The upper frame 153 and the lower frame 155 may constitute an upper portion and a lower portion of the door frame 150, and may be symmetrical to each other. The hinge 168 may be assembled to each of the upper frame 153 and the lower frame 155 to allow the rotation of the door assembly 130.

In the embodiment, the upper frame 153 and the lower frame 155 may be made of a synthetic resin material. A large load is not applied to each of the upper frame 153 and the lower frame 155 because each of the upper frame 153 and the lower frame 155 do not directly support the hinge 168, so that the upper frame 153 and the lower frame 155 may be made of a material having a relatively lower strength than a material of the side frame 151. When the upper frame 153 and the lower frame 155 are made of the synthetic resin material, a total weight of the door assembly 130 may be reduced, and more complex shapes may be realized. Accordingly, a structure of the component receiving groove S1, which will be described below, may be more easily implemented in the door frame 150.

Meanwhile, since the upper frame 153 and the lower frame 155 are symmetrical to each other, the upper frame 153 will be described below as a reference. As shown in FIG. 9, the upper frame 153 may roughly have a 'L' shape, and have a seating space 154 on which the hinge 168 is seated. The hinge 168 may be fixed to the upper frame 153 and allow the door assembly 130 to be rotated relative to the cabinet 100. Reference numeral 169 represents a hinge cover for shielding the hinge 168, and may include a first cover 169A and a second cover 169B. The hinge cover may be omitted or may include one component.

FIG. 10 is a section view showing the upper frame 153. The upper frame 153 may have a contact plate 153*b* that is perpendicularly stood. A surface of the contact plate 153*b* may be a flat surface that is in close contact with the rear surface of the front door panel 141 constituting the front surface of the panel unit 140, more precisely, with the rear surface of the bezel portion 143.

The adhesive surface G may be positioned between the surface of the contact plate 153*b* and the rear surface of the bezel portion 143. The adhesive surface G may be a portion that combines the rear surface of the bezel portion 143 with the surface of the contact plate 153*b*. In the embodiment, the double-sided tape may be attached on the adhesive surface G. The adhesive surface G may extend in a perpendicular direction to an extending direction of an adhesive surface G that is positioned between the rear surface of the bezel portion 143 and the front surface of the first side coupling plate 151*a*, and the two adhesive surfaces may be connected to each other at a corner of the door frame 150. In this case, instead of the double-sided tape, an adhesive may also be provided on the adhesive surface G. Alternatively, the front door panel 141 and the bezel portion 143 may be connected to each other by separate fasteners such as bolts.

As shown in FIG. 10, like the side frame 151, the upper frame 153 may have a structure protruding toward the panel unit 140. In the embodiment, the upper frame 153 may have a plurality of assembly coupling plates 153*a*1 to 153*a*3. The assembly coupling plates 153*a*1 to 153*a*3 may protrude in a direction toward an edge of the panel unit 140, which is opposite to the protruding direction of the contact plate 153*b*. The plurality of assembly coupling plates 153*a*1 to 153*a*3 may be provided to be coupled to the main bracket 161 and the support bracket 163 constituting the first corner bracket 160A.

The upper frame 153 may have assembly spaces 153S, and the assembly spaces 153S may include a first assembly space 153S1 and a second assembly space 153S2. More precisely, the upper frame 153 may have the plurality of assembly coupling plates 153*a*1 to 153*a*3, and the first assembly space 153S1 and the second assembly space 153S2 may be respectively positioned in intervals between the assembly coupling plates 153*a*1 to 153*a*3. A portion of the main bracket 161 and a portion of the support bracket 163 constituting the first corner bracket 160A may be partially may be respectively inserted into the first assembly space 153S1 and the second assembly space 153S2.

In the embodiment, the assembly coupling plates 153*a*1 to 153*a*3 may include a first assembly coupling plate 153*a*1, a second assembly coupling plate 153*a*2, and a third assembly coupling plate 153*a*3. Among the assembly coupling plates, the first assembly coupling plate 153*a*1 may be in close contact with the rear surface of the front door panel 141 constituting the front surface of the panel unit 140, and may extend downward from the contact plate 153*b*, as shown in FIG. 10. Accordingly, a portion of the adhesive surface G may also be provided on a front surface of the first assembly coupling plate 153*a*1.

In the side frame 151, the assembly coupling plates 153*a*1 to 153*a*3 may protrude toward the upper surface (referring to FIG. 10, upper surfaces of the internal door panel 145 and the rear door panel 147) of the window portion 142 of the panel unit 140, the assembly coupling plates 153*a*1 to 153*a*3 may include the first assembly coupling plate 153*a*1, the second assembly coupling plate 153*a*2, and the third assembly coupling plate 153*a*3. The first assembly coupling plate 153*a*1, the second assembly coupling plate 153*a*2, and the third assembly coupling plate 153*a*3 may extend in parallel to each other to form the 'E' shape, and protruding lengths thereof may be different from each other. In the embodiment, the first assembly coupling plate 153*a*1 may be the longest and the third assembly coupling plate 153*a*3 may be the shortest.

One side of a second bracket body 161*b* of the main bracket 161 may be supported by the first assembly coupling plate 153*a*1. Like the first bracket body 161*a*, the second bracket body 161*b* of the main bracket 161 may also have '⊂'-shaped cross section, so that one side of the second bracket body 161*b* may be in close contact with the first assembly coupling plate 153*a*1.

The second assembly coupling plate 153*a*2 may be spaced apart from the first assembly coupling plate 153*a*1, and the first assembly space 153S1 in which the second bracket body 161*b* of the main bracket 161 is inserted may be formed between the second assembly coupling plate 153*a*2 and the first assembly coupling plate 153*a*1. A width of the first assembly space 153S1 may be equal to or larger than a thickness of the second bracket body 161*b*, and it is preferable that the width of the first assembly space 153S1 is equal to the thickness of the second bracket body 161*b*. Accordingly, opposite surfaces of the second bracket body 161*b* may be in contact with the first assembly coupling plate 153*a*1 and the second assembly coupling plate 153*a*2.

The third assembly coupling plate 153*a*3 may be provided on the opposite side to the first assembly coupling plate 153*a*1 with the second assembly coupling plate 153*a*2 positioned between the first assembly coupling plate 153*a*1 and the third assembly coupling plate 153*a*3. The second assembly space 153S2 in which the support bracket 163 is inserted may be formed between the second assembly coupling plate 153*a*2 and the third assembly coupling plate 153*a*3. The third assembly coupling plate 153*a*3 may extend by a length relatively shorter than a length of the second assembly coupling plate 153*a*2, and a lower end of the third assembly coupling plate 153*a*3 may fix the door liner 190.

The support bracket 163 constituting the main bracket 161 may be inserted in the second assembly space 153S2, and one surface of the support bracket 163 may be in close contact with the second assembly coupling plate 153*a*2. Since the thickness of the support bracket 163 may be smaller than a width of the second assembly space 153S2, an empty space may be formed between the opposite surface of the support bracket 163 and the third assembly coupling plate 153*a*3. In this case, the opposite surfaces of the second assembly coupling plate 153*a*2 may be in close contact with one surface of the second bracket body 161*b* and the support bracket 163, and may be fastened by a single fastener. In the above case, the second assembly coupling plate 153*a*2 may have the second fastening hole 153*a*2' piercing through the second assembly coupling plate 153*a*2.

Meanwhile, the assembly spaces 153S may be connected to the coupling spaces 152. The assembly spaces 153S and the coupling spaces 152 may be connected to be perpendicular to each other in a '¬' shape, and the '¬' shape may correspond to the shapes of the main bracket 161 and the support bracket 163 constituting the first corner bracket 160A. More precisely, (i) the first assembly space 153S1 between the first assembly coupling plate 153*a*1 and the second assembly coupling plate 153*a*2 may be connected to the first coupling space 152*a* between the first side coupling plate 151*a* and the second side coupling plate 151*b*, (ii) the second assembly space 153S2 between the second assembly coupling plate 153*a*2 and the third assembly coupling plate 153*a*3 may be connected to the second coupling space 152*b* between the second side coupling plate 151*b* and the third side coupling plate 151*c*. Accordingly, the main bracket 161 may be inserted between the first assembly space 153S1 and the first coupling space 152*a*, and the support bracket 163 may be inserted between the second assembly space 153S2 and the second coupling space 152*b*.

Figure 12:
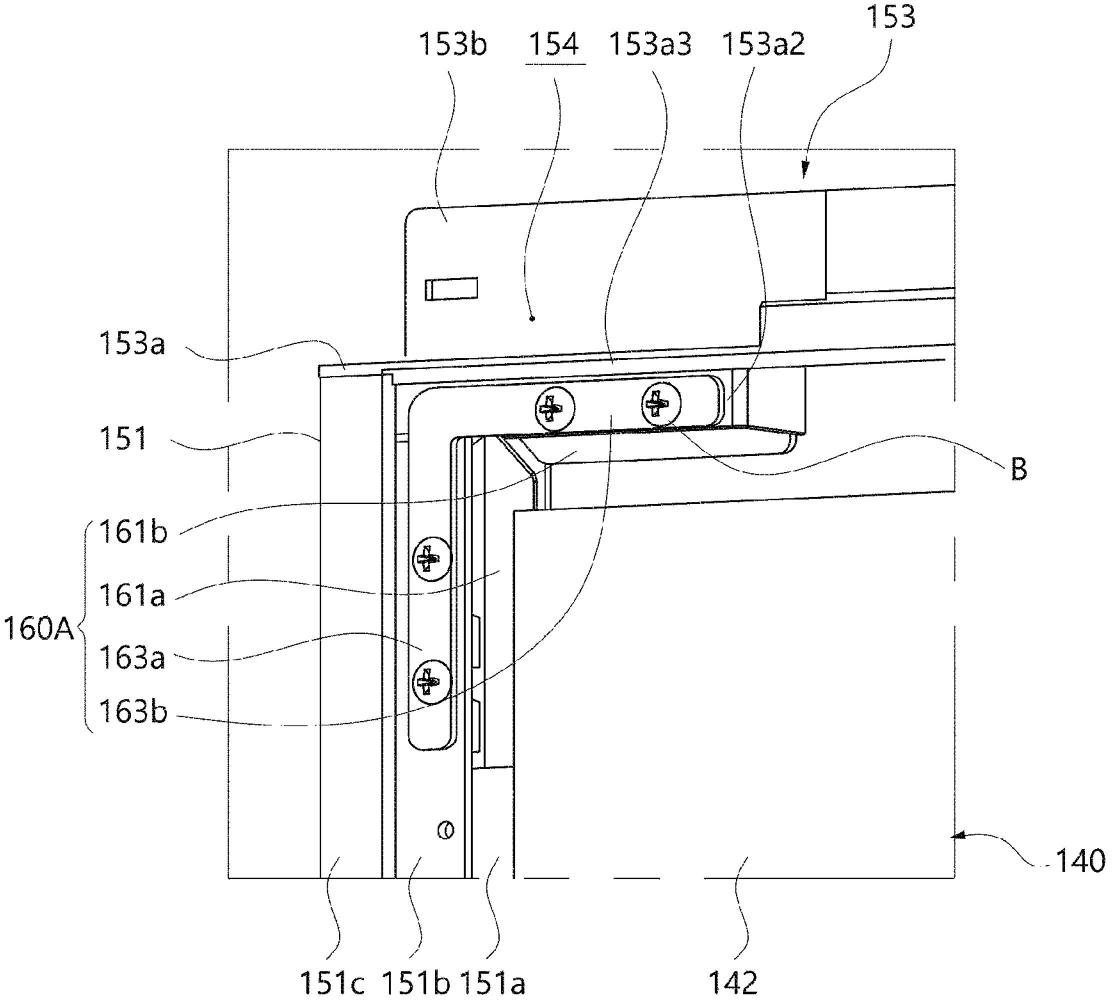
FIG. 12 is a perspective view showing a configuration of a first corner assembly of the door frame constituting the door assembly according to the present disclosure.
Figure 13:
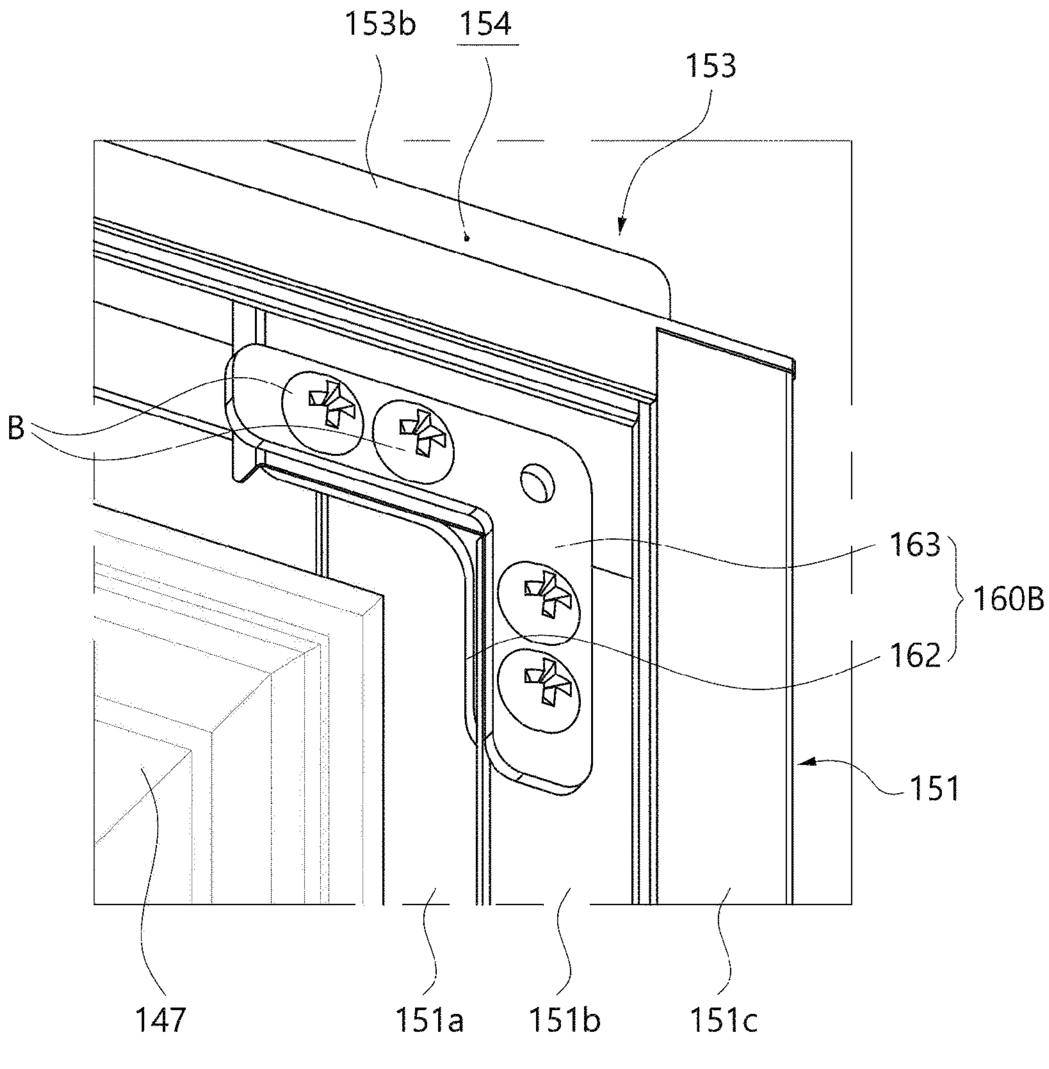
FIG. 13 is a perspective view showing a configuration of the first corner assembly of the door frame constituting the door assembly according to the present disclosure.

Furthermore, the side coupling plates 151*a* to 151*c* and the assembly coupling plates 153*a*1 to 153*a*3 may be connected to each other and formed in continuous surfaces. As shown in FIGS. 12 and 13, the second side coupling plate 151*b* and the second assembly coupling plate 153*a*2 may be continuously connected to be each other, and the support bracket 163 constituting the corner brackets 160A to 160D may be coupled on the continuous surface. For reference, FIG. 12 is a view showing the first corner bracket 160A denoted by D in FIG. 7, and FIG. 13 is a view showing the second corner bracket 160B denoted by E in FIG. 7.

Next, the corner brackets 160A to 160D will be described below. As described above, the corner brackets 160A to 160D may include the first corner bracket 160A to the fourth corner bracket 160D. Among the brackets, each of the first corner bracket 160A and the second corner bracket 160B may include the main bracket 161 and the support bracket 163. The first corner bracket 160A and the second corner bracket 160B may have the same structure, so the first corner bracket 160A will be described as a reference.

The first corner bracket 160A constituting the main bracket 161 may roughly have '¬' shape, and the first bracket body 161*a* and the second bracket body 161*b* may be connected perpendicularly to each other. The first bracket body 161*a* may be positioned in the above-described first coupling space 152*a* of the side frame 151, and the second bracket body 161*b* may be positioned in the first assembly space 153S1 of the upper frame 153. As shown in FIG. 11, the first bracket body 161*a* may have a first bracket hole 161*a*' piercing through the first bracket body 161*a* so that the first bracket hole 161*a*' may be connected to the first fastening hole 151*b*' of the second side coupling plate 151*b*. The second bracket body 161*b* may be positioned in the first assembly space 153S1 of the upper frame 153. Referring to FIG. 10, the second bracket body 161*b* may have a second bracket hole 161*b*", so the second bracket hole 161*b*" may be connected to the second fastening hole 153*a*2' of the second assembly coupling plate 153*a*2.

The main bracket 161 may have the '⊂'-shaped cross section. The main bracket 161 may be directly connected to the hinge 168 to serve as the center of rotation of the door assembly 130, and may receive a large load during the rotation of the door assembly 130. Therefore, the main bracket 161 may reinforce its strength through the '⊂'-shape. As shown in FIG. 9, the second bracket body 161*b* of the main bracket 161 may have a hinge fastening hole 161*b*' passing therethrough. Referring to FIG. 10, the upper frame 153 may be laminated on the second bracket body 161*b* and the upper frame 153 may have a hinge connection hole 154*a*. Since the hinge connection hole 154*a* is connected to the hinge fastening hole 161*b*', the hinge 168 seated in the seating space 154 of the upper frame 153 may be fixed to the door frame 150 when a fastener is fastened to the hinge fastening hole 161*b*' through the hinge connection hole 154*a*.

Meanwhile, the support bracket 163 may have '¬' shape like the main bracket 161. Referring to FIG. 12, the support bracket 163 may include the first support body 163*a* and a second support body 163*b*. The first support body 163*a* may be positioned in the second coupling space 152*b* of the side frame 151, and the second support body 163*b* may be positioned in the second assembly space 153S2 of the upper frame 153. Since the main bracket 161 connects the upper frame 153 to the side frame 151, the support bracket 163 may be omitted, but the support bracket 163 may be assembled to the main bracket 161 to maintain the assembly structure thereof more firmly. As shown in FIG. 9, the support bracket 163 may include a first support hole 163*a*' and a second support hole 163*b*'. The first support hole 163*a*' and the second support hole 163*b*' may correspond to the first bracket hole 161*a*' and the second bracket hole 161*b*" of the main bracket 161. Referring to FIG. 11, the first support hole 163*a*' of the support bracket 163 may be connected to the first bracket hole 161*a*' through the first fastening hole 151*b*' of the second side coupling plate 151*b*. Therefore, when a fastener passes through the first support hole 163*a*', the first fastening hole 151*b*', and the first bracket hole 161*a*', the main bracket 161, the second side coupling plate 151*b*, and the support bracket 163 may be fastened to each other. The above structure is shown in FIG. 12.

Referring to FIG. 10, the second support hole 163*b*' of the support bracket 163 may be connected to the second bracket hole 161*b*" through the second fastening hole 153*a*2' of the second assembly coupling plate 153*a*2. Therefore, when a fastener passes through the second support hole 163*b*', the second fastening hole 153*a*2', and the second bracket hole 161*b*", the main bracket 161, the second assembly coupling plate 153*a*2, and the support bracket 163 may be fastened. In other words, the support bracket 163 also eventually serves to connect the side frame 151 to the lower frame 155.

Referring to FIG. 9, each of the first corner bracket 160A and the fourth corner bracket 160D may include the main bracket 161 and the support bracket 163. However, the third corner bracket 160C may include one bracket, and the second corner bracket 160B may include two brackets, but does not have the same structure as the main bracket 161 of the first corner bracket 160A or the fourth corner bracket 160D and have simply flat plate-shaped brackets. As described above, a portion to which the hinge 168 is coupled may have the main bracket 161 and the support bracket 163 for strength reinforcement, but a portion without the hinge 168 may have a different structure from the portion with the hinge 168.

Meanwhile, the operation module may be installed in the door frame 150. The operation module may refer to devices that are operated using electricity like the input device 170, the detection device 175, or display device. In the embodiment, the input device 170 and the detection device 175 may be installed in the door frame 150.

Referring to FIG. 6, the operation module may be installed on an upper portion of the front door panel 141 constituting the door assembly 130, i.e. on the bezel portion 143. In the embodiment, the input device 170 may be installed in a portion A, and the detection device 175 may be installed in a portion B. When a user is detected in from of part B, a light emitting portion 172 provided to notify a position of a touch sensor 173 may emit light around the input device 170 in the portion A, and the user can touch the touch sensor 173 to operate the door opening device 900 to open the door assembly 130. In particular, the detection device 175 for detecting approach of the user may be preferably installed in the center of the upper portion of the front door panel 141. The light emitting portion 172 may be a light emitting diode (LED) lamp 172.

Figure 14A:
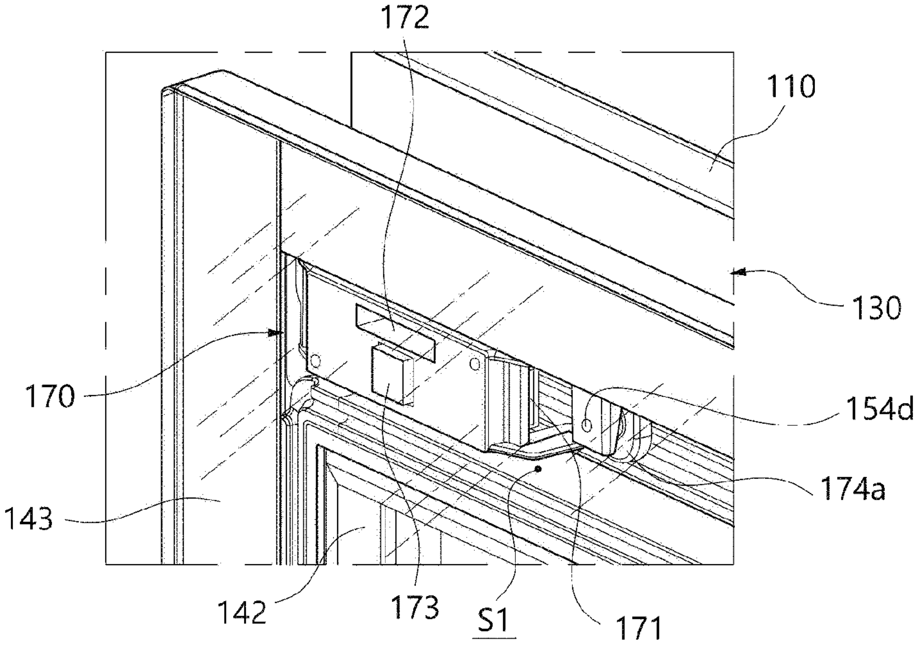
FIGS. 14A and 14B are enlarged-perspective views showing portions A and B in FIG. 6.
Figure 14B:
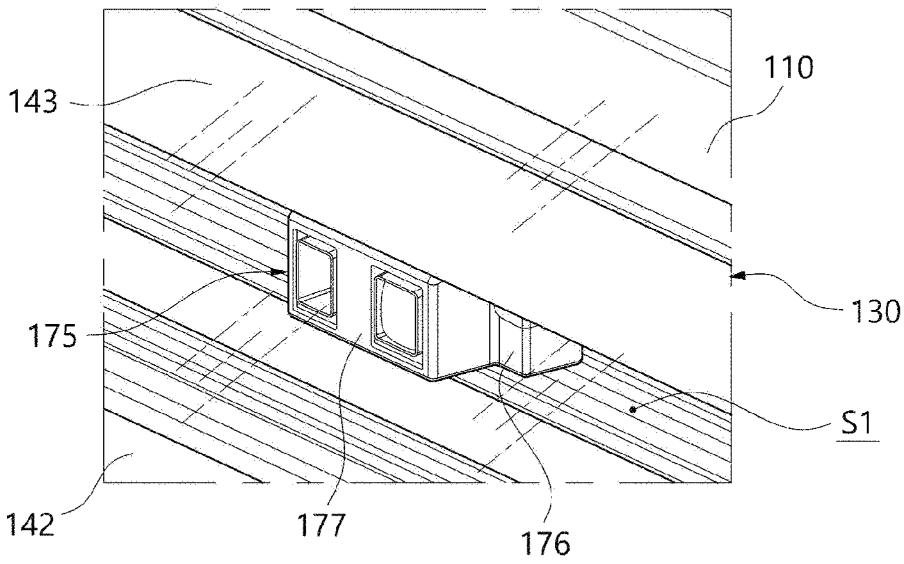

FIGS. 14A and 14B are views showing the input device 170 and the detection device 175, respectively. The operation module (the input device 170 and the detection device 175) may be installed in the rear surface of the bezel portion 143 of the panel unit 140. More precisely, the door frame 150 may be spaced apart from the perimetric surface of the insulation door panel 145, 147, so that the component receiving groove S1 is formed between the door frame 150 and the perimetric surface, and the operation module may be installed in the component receiving groove S1.

In more detail, the door frame 150 and the perimetric surface of the insulation door panel 145, 147 may be spaced apart from each other so that the component receiving groove S1 may be provided therebetween. The operation module may be installed inside the component receiving groove S1, and a portion of the operation module may be arranged to face the front surface of the panel unit 140 through the bezel portion 143. Because the component receiving groove S1 is formed at the rear surface-side of the bezel portion 143, as shown in FIGS. 14A and 14B, the operation module installed in the component receiving groove S1 may face the front of the bezel portion 143.

In the embodiment, the component receiving groove S1 may refer to an empty space that is defined as a space between an upper surface of the perimetric surface of the insulation door panel 145, 147, the rear surface of the bezel portion 143, and a lower surface of the door frame 150.

The component receiving groove S1 may be continuously formed along the door frame 150 and at least two surfaces of perimetric surface of the insulation door panel 145, 147. In the embodiment, the component receiving groove S1 may be formed at all four sides along the perimetric surface of the insulation door panel 145, 147, and wires connected to the operation module may be received along the component receiving groove S1.

The bezel portion 143 may be made of a transparent or translucent material, so that the operation module installed inside the component receiving groove S1 may be recognized from the outside. In the embodiment, the bezel portion 143 is covered with a translucent film, so that the operation module is not recognized immediately, but the operation module may be recognized when light is emitted from the LED lamp 172 provided in the input device 170. Therefore, the user can detect the position of the input device 170 and precisely touch the touch sensor 173.

Figure 15:
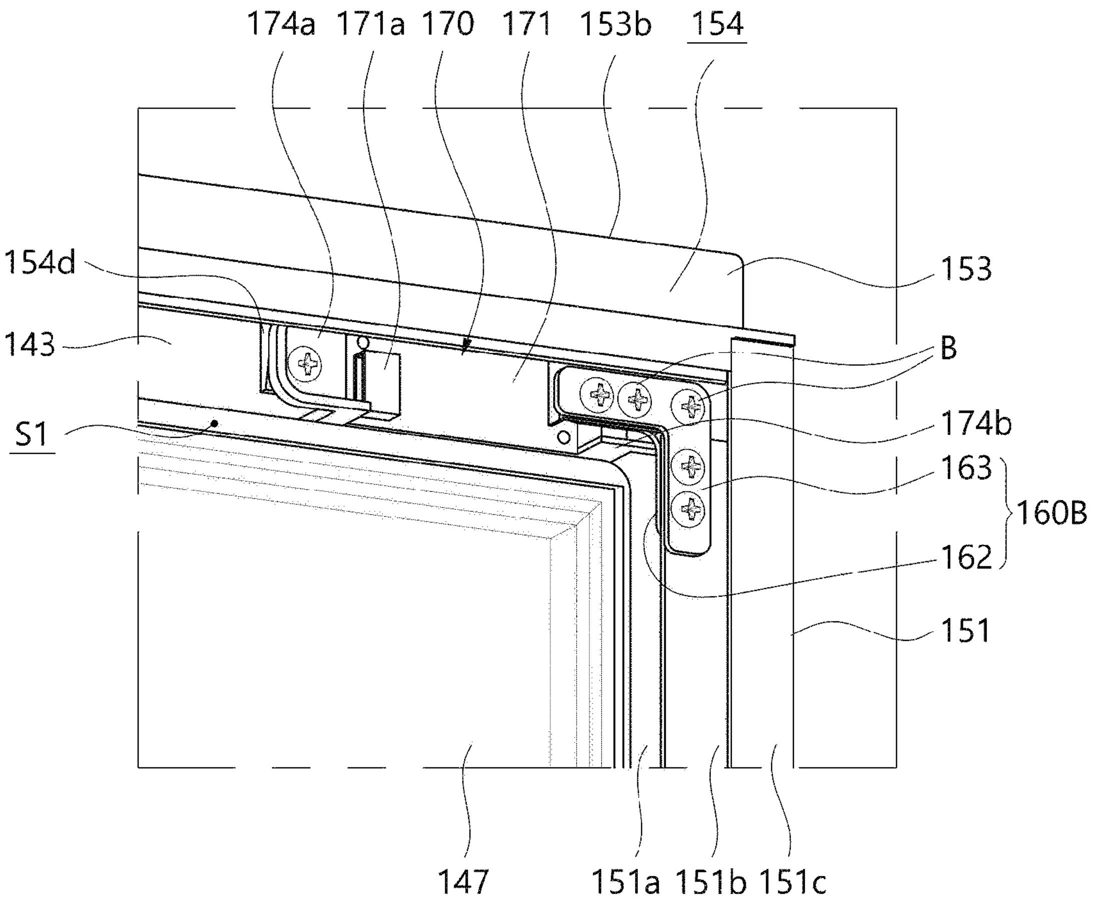
FIG. 15 is a perspective view taken from the rear of the door assembly, the view showing an operation module that is installed in the door assembly according to the present disclosure.
Figure 16:
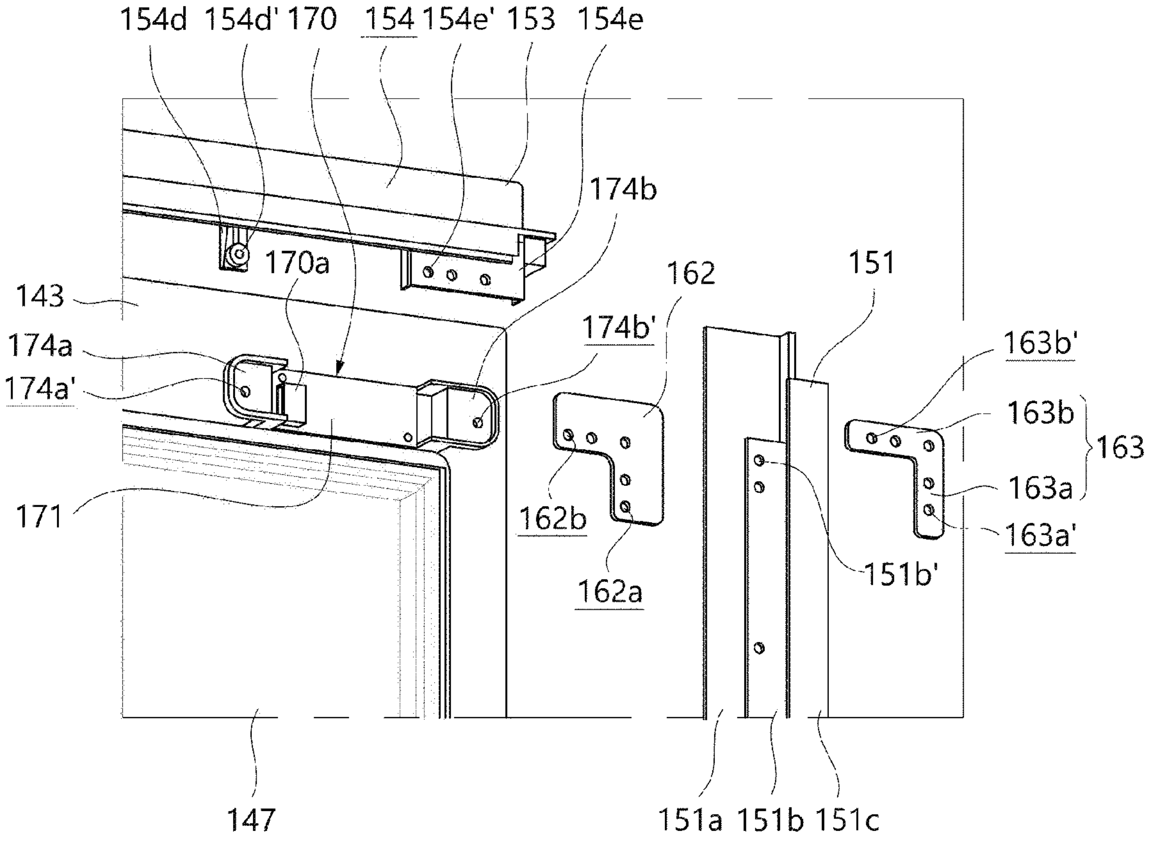
FIG. 16 is an exploded-perspective view showing components of the operation module and the door assembly in FIG. 15.

Referring to FIGS. 15 and 16, the door frame 150 may have a fixing flange 154*d*, 154*e* that protrudes toward the component receiving groove S1. More precisely, the fixing flange 154*d*, 154*e* may protrude from the upper frame 153 and provided to fix the input device 170. As shown in the drawings, the fixing flange 154*d*, 154*e* may include a pair of flanges, and a first fixing flange 154*d* may be arranged at the left and a second fixing flange 154*e* may be arranged at the right on the basis of the drawings. The input device 170 may be positioned between the first fixing flange 154*d* and the second fixing flange 154*e*.

The first fixing flange 154*d* and the second fixing flange 154*e* do not need to have the same structures as each other, and may be formed in various shapes. In particular, the upper frame 153 is made of a synthetic resin material in the embodiment, so the fixing flange 154*d*, 154*e* may be formed in various shapes.

The first fixing flange 154*d* may have a first fixing hole 154*d*', and the second fixing flange 154*e* may have a second fixing hole 154*e*'. The first fixing hole 154*d*' may correspond to a first installation hole 174*a*' of a first installation bracket 174 of installation bracket 174*a*, 174*b* connected to the input device 170, and may be a portion that is fastened by a bolt B, and the like.

The second fixing hole 154*e*' may correspond to a second installation hole 174*b*' of a second installation bracket 174*b* of the installation bracket 174*a*, 174*b* of the input device 170. The second fixing hole 154*e*' may be not only assembled with the second installation hole 174*b*', but also fastened with the main bracket 162 and the support bracket 163 constituting the second corner bracket 160B. In other words, a fastener such as a bolt B may be fastened in the following order: (i) the second support hole 163*b*' of the support bracket 163, (ii) the second fixing hole 154*e*' of the second fixing flange 154*e*, (iii) the second main fastening hole 162*b* of the main bracket 162, and (iv) the second installation hole 174*b*' of the second installation bracket 174*b*. Whereby, the input device 170 may be firmly installed in the door frame 150.

Reference numeral 162*a* is a first main fastening hole for assembling the main bracket 162 to the first fastening hole 151*b*' of the second side coupling plate 151*b*.

As shown in FIG. 15, when the door assembly 130 is viewed from the rear, the first installation bracket 174*a* may be stacked above the first fixing flange 154*d*, and the second installation bracket 174*b* may be stacked below the second fixing flange 154*e*, and the main bracket 162 and the support bracket 163 may be stacked above the second fixing flange 154*e*. Therefore, the input device 170 may be fixed more firmly, but it is possible to increase the fastening stability so that the user cannot arbitrarily separate the input device 170.

Since the installation bracket 174*a*, 174*b* is fastened to the fixing flange 154*d*, 154*e* by a fastener to while the installation bracket 174*a*, 174*b* is connected to the operation module, the operation module may be fixed to the component receiving groove S1 in a detachable state. Of course, at least one of the first fixing flange 154*d* and the second fixing flange 154*e* may be omitted.

Although not shown in the drawings, the door frame 150 may have a hook that protrudes toward the component receiving groove S1, and the operation module may be fastened in a detachable state by being locked to the hook. That is, when the operation module is inserted into the component receiving groove S1 while elastically transforming the hook S1 and the hook S1 is recovered, the operation module may be fixed to the component receiving groove S1. The hook S1 may protrude toward the component receiving groove S1, and allow the operation module to be brought into close contact with the rear surface of the bezel portion 143.

For example, in FIG. 14B, the detection device 175 may have a casing 177, and the casing 177 may have a stopper 176 so that the stopper 176 may be locked to the hook S1. Of course, the detection device 175 may be fixed in the component receiving groove S1 by having the same structure as the input device 170.

Referring to FIGS. 14A and 14B, when the operation module is installed in the component receiving groove S1, a front surface of the operation module may protrude more than the fixing flange 154*d*, 154*e* in a direction toward the rear surface of the bezel portion 143. Therefore, the components, such as the fixing flange 154*d*, 154*e* and the installation bracket 174*a*, 174*b*, may be arranged the relatively inside, and may not be visible in the front of the door assembly 130, thereby decreasing the aesthetics thereof. On the contrary, the operation module may be installed to be close to the front of the door assembly 130, so that the user can see light of the LED lamp 172, or a display (not shown) installed in the bezel portion 143 as well.

Looking at the operation module, the input device 170 shown in FIG. 14A may include the LED lamp 172 and the touch sensor 173. The LED lamp 172 may serve to emit light for providing a position of the input device 170, and the touch sensor 173 may be operated in a capacitance manner and may operate the door opening device 900 when the user touches the touch sensor 173 so that the door assembly 130 may be opened.

The input device 170 may include a separate input substrate 171 and control the touch sensor 173 and the LED lamp 172. The input substrate 171 may be provided to control the input device 170 and may consist of a printed circuit board. The LED lamp 172 and the touch sensor 173, etc. may be installed in the input substrate 171, and an input connector 170*a* may be provided in a rear surface of the input substrate 171 as shown in FIG. 15. The input connector 170*a* may be provided to connect the input substrate 171 to a control module 700, and to which a relative connector (not shown) and a portion of a wire harness may be connected.

The LED lamp 172 of the input device 170 may be omitted and the touch sensor 173 may consist of various proximity sensors instead of a capacitance type sensor. Alternatively, without including the touch sensor 173, the input device 170 may include a microphone that detects sound waves due to the vibration, and may be configured as a knock detection device that recognizes a knock operation of the user. In addition, the input device 170 may include a camera (not shown) to recognize a specific motion of the user as a door opening signal to operate the door opening device 900.

FIG. 14B is a view showing the detection device 175. The detection device 175 may be provided to recognize that the user is positioned in front of the door assembly 130. More precisely, a position sensing device (PSD) may be used in the detection device 175. In other words, the detection device 175 may be configured such that a light emitting portion emits infrared light and a light receiving portion measures an angle of reflected light to recognize a position of the user. A proximity distance detectable by the PSD may be preset. For example, when the detection distance is preset within 1 m and the user is positioned within 1 m of the front of the refrigerator, it may be determined that the user is positioned in front of the refrigerator for manipulation. Reference numeral 177 represents the casing of the detection device 175.

In the embodiment, the operation module may be installed in an upper portion of the rear surface of the bezel portion 143 of the panel unit 140. When the size of the door assembly 130 is small, for example, when the door assembly 130 is applied to a product with low height such as a wine refrigerator, the user cannot recognize the input device 170 or it may be difficult the user to manipulate the touch sensor 173 of the input device 170. Alternatively, the operation module may be installed under the bezel portion 143 or may be installed on the left or right side of the bezel portion 143. In the embodiment, the component receiving groove S1 may be provided at all four surfaces along the perimetric surface of the insulation door panel 145, 147, so that the installation position of the operation module may be freely preset.

In particular, in the embodiment, the detection device 175 may be arranged in the center of the upper portion of the bezel portion 143 in the upper rear surface of the bezel portion 143. Therefore, the detection device 175 arranged in the center without being biased to either side may more efficiently detect the approach of the user.

In the embodiment, the detection device 175 and the input device 170 may be installed to be spaced apart from each other at the same height inside the component receiving groove S1. In other words, both the detection device 175 and the input device 170 that are installed in the upper frame 153 may have the same height, so that the installation and maintenance performance of the operation module may be improved.

The detection device 175 may be installed in the center of the upper portion of the component receiving groove S1, while the input device 170 may be installed in a portion opposite to the side provided with the hinge 168 in the upper portion of the component receiving groove S1. Accordingly, the user manipulating the input device 170 can naturally stand at an entrance side where the door assembly 130 is opened.

Meanwhile, the component receiving groove S1 may be shielded by the door liner 190 to be described below. The component receiving groove S1 may be configured such that a first side faces the rear surface of the bezel portion 143 and a second side faces the door liner 190, so that when the door liner 190 is separated from the door frame 150, the component receiving groove S1 is exposed through the second side thereof. Accordingly, a repair operator can separate the door liner 190 from the door frame 150 to maintain the operation module.

The heater frame 180 may be installed on an edge of the door frame 150. The heater frame 180 may be inserted in a space between the door frame 150 and the perimetric surface of the insulation door panel 145, 147, i.e. in the component receiving groove S1. The heater frame 180 may be provided to prevent condensation on the panel unit 140, and in which a heating line (not shown) may be embedded. The condensation may occur due to inside and outside temperature difference of the refrigerator near a portion to which the door assembly 130 contacts in the front surface of cabinet 100, or condensation may occur due to heat transfer at attached portions between several layers of glass constituting the panel unit 140, and the heating line may prevent the condensation.

Referring to FIG. 8, the heater frame 180 may be roughly formed in the rectangular frame, and the heater frame 180 may be larger than the internal door panel 145 and the rear door panel 147 constituting the window portion 142, but smaller than the door frame 150. In FIGS. 10 and 11, in the heater frame 180 shown in the drawings, a heater groove 182 in which the heating line is inserted may be formed along the heater frame 180. The heater groove 182 may be continuously formed around the entire heater frame 180 or may be formed only in some section of the heater frame 180.

The heater groove 182 may have a shape that is partially opened to the rear surface of the front door panel 141 constituting the front surface of the panel unit 140 among the several layers of glass. Therefore, heat generated from the heating line embedded in the heater groove 182 may be transmitted to the rear surface of the front door panel 141 and may efficiently prevent the condensation.

The door liner 190 may be assembled at the rear of the heater frame 180. The door liner 190 may be assembled to the door frame 150 with the heater frame 180 positioned between the door liner 190 and the door frame 150, and formed in a rectangular frame. The door liner 190 may be assembled to the door frame 150 to shield the component receiving groove S1 described above. The component receiving groove S1 may be configured such that a first side thereof faces the rear surface of the bezel portion 143 and a second side thereof faces the door liner 190, and the component receiving groove S1 may be exposed in a direction toward the second side when the door liner 190 is separated from the door frame 150. Accordingly, the repair operator can separate the door liner 190 to maintain the operation module.

As described above, when the door liner 190 is assembled to the door frame 150, the component receiving groove S1 may be shielded. Accordingly, the frames constituting the door frame 150, the assembly portions of the brackets, and wires may not be exposed, thereby enhancing the refrigerator aesthetics.

The door liner 190 may be fixed such that edges thereof is locked to ends of the second assembly coupling plate 153*a*2 (referring to FIG. 10) and the second side coupling plate 151*b* (referring to FIG. 11). The door liner 190 may be made of a synthetic resin material and have some elasticity, so the door liner 190 may be assembled to the second assembly coupling plate 153*a*2 and the second side coupling plate 151*b* due to elastic deformation during the assembly process to the door frame 150. In other words, the door liner 190 may be assembled to the door frame 150 without separate fasteners. Of course, the door liner 190 may be firmly fixed to the door frame 150 with separate fasteners.

The door liner 190 may have a support rib 193. The support rib 193 may protrude from a front surface of the door liner 190, and may protrude toward the heater frame 180. The support rib 193 may support the heater frame 180 in a direction toward the rear surface of the front door panel 141 that constitutes the front surface of the several layers of glass, so that the heating line may be in close contact with the front door panel 141. Although not shown in the drawing, the door liner 190 may have a separate lighting device for lighting the inside of the door assembly 130.

The gasket 195 may be coupled to a rear surface of the door liner 190. The gasket 195 may be in close contact with a circumference of the cabinet 100 to prevent cool air in the storage space 121 from leaking between the door assembly 130 and the cabinet 100.

Lastly, a wire guide 197 may be assembled to the door frame 150. The wire guide 197 may be provided at a corner portion where the side frame 151 and the lower frame 155 constituting the door frame 150 are connected to each other, and may serve to guide the wires of the operation module or the heating line into the cabinet 100.

Figure 17:
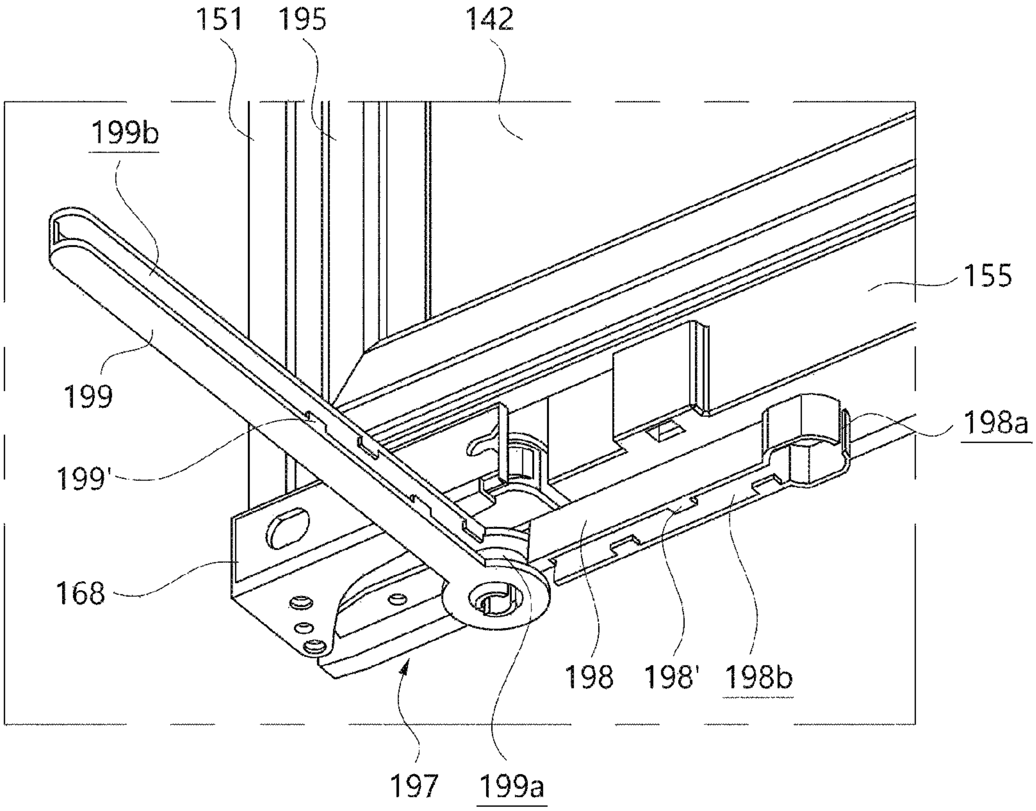
FIG. 17 is a perspective view showing a configuration of a wire guide of the door assembly according to the embodiment of the present disclosure.

Referring to FIG. 17, the configuration of the wire guide 197 is shown in the drawing. The wire guide 197 may include a first guide body 198 and a second guide body 199, and the guide bodies may be configured to be rotated relatively to each other. In the embodiment, the first guide body 198 may be assembled along a lower surface of the lower frame 155 and have a first guide channel 198*b* through which the wires pass therein. The first guide body 198 may have stoppers 198' blocking the first guide channel 198*b* to prevent the wires from escaping.

One end of the first guide body 198 is opened and an insertion groove 198*a* is formed on the end thereof. The insertion groove 198*a* may be an entrance into which the wires are inserted, and when the first guide body 198 is made of synthetic resin, the insertion groove 198*a* is laterally opened so that the wires may be easily inserted.

The first guide body 198 may be connected to the second guide body 199. The second guide body 199 may be configured to be rotated relative to the first guide body 198, and a wire connection groove 199*a* may be recessed at a portion where the second guide body 199 is assembled to the first guide body 198. In other words, the wire connection groove 199*a* may be provided in the center of rotation of the second guide body 199 rotatably connected to the first guide body 198, and the wire connection groove 199*a* may be connected to the first guide channel 198*b*.

A second guide channel 199*b* in which wires are inserted and guided is provided inside the second guide body 199. The second guide body 199 may also have a stopper 199' blocking the second guide channel 199*b* to prevent the wires from escaping. The second guide channel 199*b* may be an outlet that is opened so that the wires may escape through the outlet. The second guide body 199 may be connected to the inside of the cabinet 100, and the wires guided to the second guide body 199 may be connected to the control module 700 inside the cabinet 100.

Next, an assembly process of the door assembly 130 according to the embodiment of the present disclosure will be described. The door frame 150 may be assembled, the pair of side frames 151 constituting the door frame 150 and the upper frame 153 and the lower frame 155 connecting the upper portions and lower portions of the pair of side frames 151 to each other may be arranged in a rectangular shape, and then the frames may be connected to each other using the corner brackets 160A to 160D.

More precisely, the first corner bracket 160A to the fourth corner bracket 160D may be assembled at the four corners, and the door frame 150 in the rectangular shape may be complete. The first corner bracket 160A and the fourth corner bracket 160D may include respective the main bracket 161 and the support bracket 163. The first bracket body 161*a* of the main bracket 161 may be inserted in the first coupling space 152*a*, and the second bracket body 161*b* perpendicular to first bracket body 161*a* may be inserted in the first assembly space 153S1.

Then, the main bracket 161 may be coupled to the support bracket 163 with the second side coupling plate 151*b* and the second assembly coupling plate 153*a*2 positioned therebetween, and the main bracket 161 to the support bracket 163 may be assembled by fasteners. Accordingly, the door frame 150 may be maintained in the firmly assembled state.

As described above, the assembly of the door frame 150 may be primarily completed. In the present disclosure, the foaming agent may be filled inside the door frame 150. Therefore, both the installation and separation of the operation module to/from the door assembly 130 may be performed easily. In particular, when the door liner 190 is separated from the door assembly 130, the component receiving groove S1 receiving the components may be directly exposed to the outside, so that maintenance of the components may be easily performed.

Next, the panel unit 140 may be coupled to the door frame 150. The panel unit 140 may be already laminated in several layers. In the embodiment, the panel unit 140 may be configured such that the front door panel 141, the internal door panel 145, and the rear door panel 147 are laminated in order and then coupled to each other. Since the front door panel 141 of the panel unit 140 may be larger than the rest of the several layers of glass, the bezel portion 143, which is a kind of stepped portion, may be formed in the front door panel 141 and the door frame 150 may be coupled to the bezel portion 143.

Figure 18:
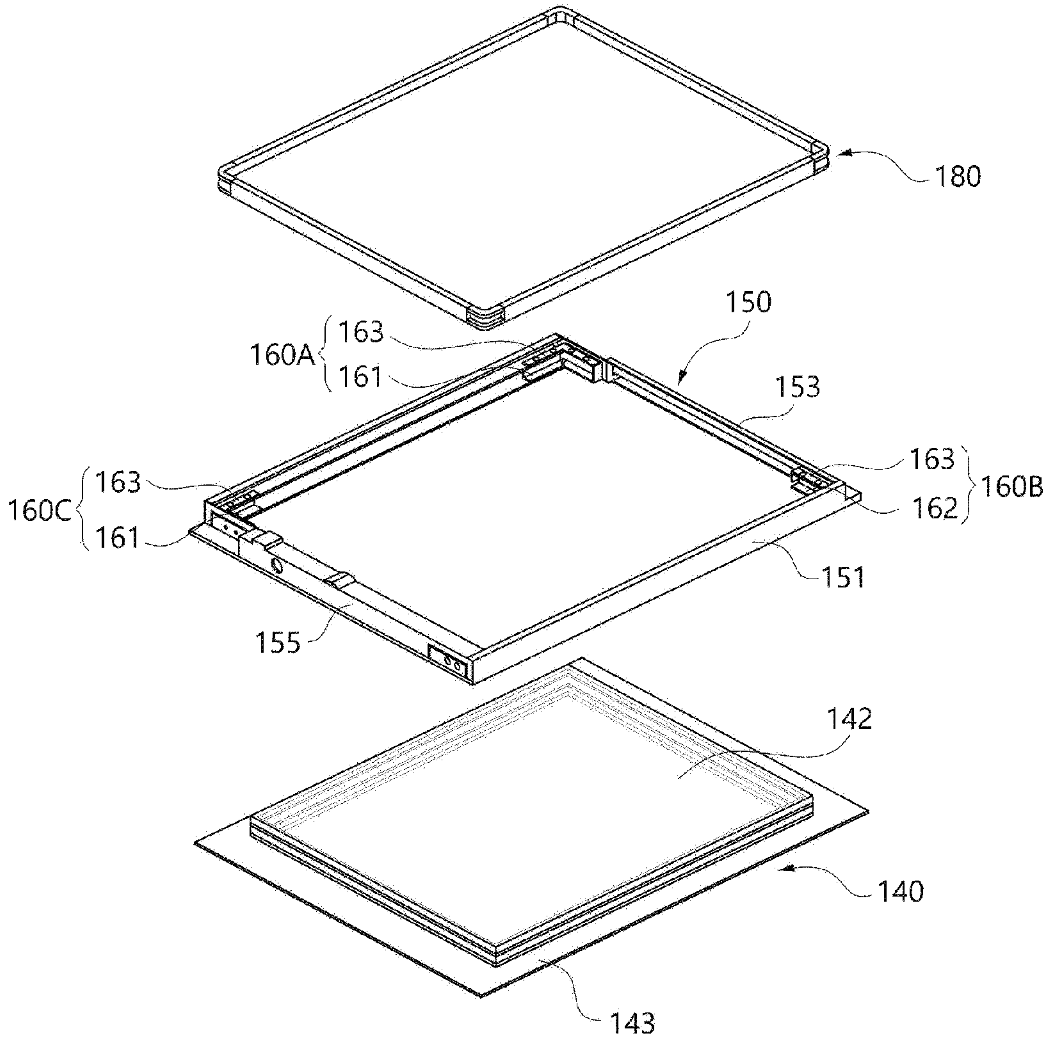
FIG. 18 is an exploded-perspective view showing a panel assembly, the door frame, and a heater frame of the door assembly according to the embodiment of the present disclosure.

More precisely, the door frame 150 may be arranged on the rear surface of the bezel portion 143, and an adhesive material such as the double-sided tape, etc. may be provided therebetween. Then, when the panel unit 140 and the door frame 150 are strongly compressed using a separate jig or device, the rear surface of the bezel portion 143 and the front surface of the door frame 150 may adhere to each other. In FIG. 18, the completed door frame 150 is arranged in the rear of the panel unit 140.

In this case, the component receiving groove S, which is a kind of empty space, may be formed between the perimetric surface of the insulation door panel 145, 147 of the panel unit 140 and the door frame 150. The input device 170 and the detection device 175 that are the operation module may be installed in the component receiving groove S1. The operation module may be positioned in the portion corresponding to the rear surface of the bezel portion 143, and may be fixed by the component bracket, so that the operation module may be separated from the component receiving groove S1.

Then, the heater frame 180 may be inserted into the component receiving groove S1 formed between the perimetric surface of the insulation door panel 145, 147 of the panel unit 140 and the door frame 150. In a state in which the heating line is inserted in the heater groove 182 of the heater frame 180, the heater frame 180 may be inserted into the component receiving groove S1. In FIG. 18, the heater frame 180 is shown as a state in which the heater frame 180 is spaced apart from the door frame 150.

Then, the heating line and the wire bundle connected to the operation module may be arranged, and the wire bundle may be arranged along the component receiving groove S1. The wire bundle may be inserted into the wire guide 197 assembled to the door frame 150. Then, the door liner 190 may be assembled to the door frame 150. The door liner 190 may be assembled to the rear surface of the door frame 150 and shield the component receiving groove S1. In other words, the door liner 190 may prevent the frames constituting the door frame 150, the assembly portions of the brackets, and the wires from being exposed to the outside, thereby enhancing the refrigerator aesthetics.

Simultaneously, the support rib 193 of the door liner 190 may press the heater frame 180 toward the front door panel 141 to firmly fix the heater frame 180, thereby allowing the heating line to transfer heat to the front door panel 141.

Then, the gasket 195 may be assembled to the rear surface of the door liner 190, and finally, the hinge 168 may be assembled to the door frame 150. The hinge 168 may be assembled to each of the seating space 154 of the upper frame 153 and the seating space 154 of the lower frame 155. The hinge 168 may be seated on each of the upper frame 153 and the lower frame 155, but an actually fastened and supported portion may be the main bracket 161 that is assembled inside the hinge.

The completed door assembly 130 may be assembled to the cabinet 100. When one side of the hinge 168 is assembled to an edge of the cabinet 100, the door assembly 130 may be rotated relative to the cabinet 100.

Next, a machine room frame 200 constituting the machine room assembly will be described. The machine room frame 200 may be a configuration providing a lower structure of the refrigerator according to the present disclosure. The air conditioning module 600 to be described below may be installed in the machine room frame 200, and the cabinet 100 may be coupled to an upper portion of the machine room frame 200.

As shown in FIG. 1, the machine room frame 200 may be installed at a lower portion of the outer casing 110, and may be roughly formed in a rectangular frame as shown in FIG. 3. In the embodiment, the machine room frame 200 may have an open upper portion, and a machine room 201 may be positioned inside the machine room frame 200 so that at least a portion of the air conditioning module 600 may be installed therein.

Although not shown in the drawings, the inner casing 120 and the machine room frame 200 may be formed of a single component. In this case, a separate partitioning wall may be provided between the storage space 121 and the machine room 201, thereby partitioning the storage space 121 and the machine room 201 from each other.

An intake and exhaust grill 220 may be provided in an open front surface of the machine room frame 200, which is the front of the machine room 201. The intake and exhaust grill 220 may serve to guide air introduced into the machine room 201 from the machine room 201 or to guide air discharged from the inside of the machine room 201 to the outside thereof, and may serve to block the open front surface of the machine room 201.

In addition, the intake and exhaust grill 220 may have an inlet 225*a* and an outlet 225*b*. The inlet 225*a* and the outlet 225*b* may be separately provided in partitioned positions by a partition 230, which will be described below. In the embodiment of the present disclosure, when the refrigerator is viewed from the front, the inlet 225*a* and the outlet 225*b* are distinct as the inlet 225*a* at the left side and the outlet 225*b* at the right side, but the arrangement thereof may be reversed.

Meanwhile, referring to FIG. 3, a rear portion of the cover plate 250 that constitutes an upper surface of the machine room frame 200 may protrude upward more than other portions thereof, so that a rear portion of the inside of the machine room 201 may be formed higher than other portions thereof. In other words, considering that protruding heights of a cooling fan 611 and the compressor 610 that are installed in the machine room 201, the rear portion of the inside of the machine room 201 may be formed higher than other portions thereof. In particular, since the compressor 610 is the highest components inside the machine room 201 in the embodiment, the cover plate 250 may have a protruding portion 255 corresponding to the height of the compressor 610.

The cover plate 250 may have an auto-door installation portion 253 in which the door opening device pp 900 is installed. The auto-door installation portion 253 may be provided in a front portion of, i.e. in a front portion facing the door assembly 130 in the cover plate 250, and may protrude upward to secure a lower space and the lower space may be open downward. The auto-door installation portion 253 may protrude upward like the upwardly protruding rear portion of the cover plate 250, but the protruding height of the auto-door installation portion 253 may be lower than the protruding height of the rear portion of the cover plate 250 in the embodiment.

For example, the push rod 950 constituting the door opening device 900 is shown in a protruding state in FIG. 2. The push rod 950 may protrude from the door opening device 900 and push a contact portion B positioned on the inside surface of the door assembly 130. The door opening device 900 may be manipulated by the input device 170 among the operation module described above.

The cover plate 250 may have a connector housing 257. The connector housing 257 may be a portion in which the wire harness extending from the control module (not shown) which will be described below is embedded, and may serve to guide an extending direction of the wire harness. More specifically, the connector housing 257 may guide the wire harness extending upward from the control module at the lower side of the cover plate 250 to the rear side, i.e. toward a rear surface plate 213.

Next, the beds 300*a* to 300*d* will be described below. The beds 300*a* to 300*d* may be installed inside the storage space 121 and serve to partition the storage space 121 into several layers. However, the beds 300*a* to 300*d* may allow the layers to communicate with each other without partitioning the storage space 121 into completely independent spaces. For the communication between the storage spaces, the beds 300*a* to 300*d* may have a gap that is open in a vertical direction in the embodiment.

Each of the beds 300*a* to 300*d* may be formed in a flat tray structure or a tray structure having a perimetric wall, and food may be placed on an upper surface of the bed. Guide rails 122 (referring to FIG. 3) may be provided on wall surfaces of opposite sides inside the storage space 121 (opposite sides inside the inner casing 120). Each of the beds 300*a* to 300*d* may be configured such that opposite side surfaces thereof are guided by the guide rails 122 to move back and forth and ejected from the storage space 121 in a drawer manner. Although not shown in the drawings, the beds 300*a* to 300*d* may be ejected in the drawer manner by various structures.

The beds 300*a* to 300*d* may include a plurality of beds, and the barrier 400 may be positioned in the middle of the plurality of beds. The barrier 400 may be installed in parallel with the beds 300*a* to 330*d* across the storage space 121, and may partition the storage space 121. Unlike the beds 300*a* to 330*d*, the barrier 400 may partition the storage space 121 into spaces independent from each other, so that an upper portion and a lower portion of the storage space 121 based on the barrier 400 may be different spaces from each other. Therefore, the upper space of the barrier 400 and the lower space thereof may be independently controlled to have different temperatures.

A display module 800 may be installed on a front surface 430 of the barrier 400. The display module 800 may be configured to display each state of the refrigerator and to perform various controls. The state displayed from the display module 800 may be the temperature in the storage space 121, operation mode display, etc.

The display module 800 may be configured to be operated in a touch type, a bottom type, or a switch type. The display module 800 may be provided in the cabinet 100, or may be provided at the door assembly 130. However, when the display module 800 is provided at the door assembly 130, various signal lines or power lines may have complicated connection structures. Considering the problem, it may be preferable that the display module 800 is provided in the cabinet 100.

In addition, since the window portion 142 that is the inside portion of the door assembly 130 is made of glass capable of internal observation, it may be preferable that the display module 800 is installed in the front of the barrier 400 that is installed at a middle height of the storage space 121.

Next, the grill fan module 500*a*, 500*b* will be described below. The grill fan module 500*a*, 500*b* may be configured to circulate air inside the storage space 121. The grill fan module 500*a*, 500*b* may be provided in the front of a rear wall surface constituting the inner casing 120, and suction air from the lower side in the storage space 121 and then discharge the air to the upper side in the storage space 121. The upper side and the lower side of the storage space 121 may be determined on the basis of the middle height of the storage space 121.

Figure 5:
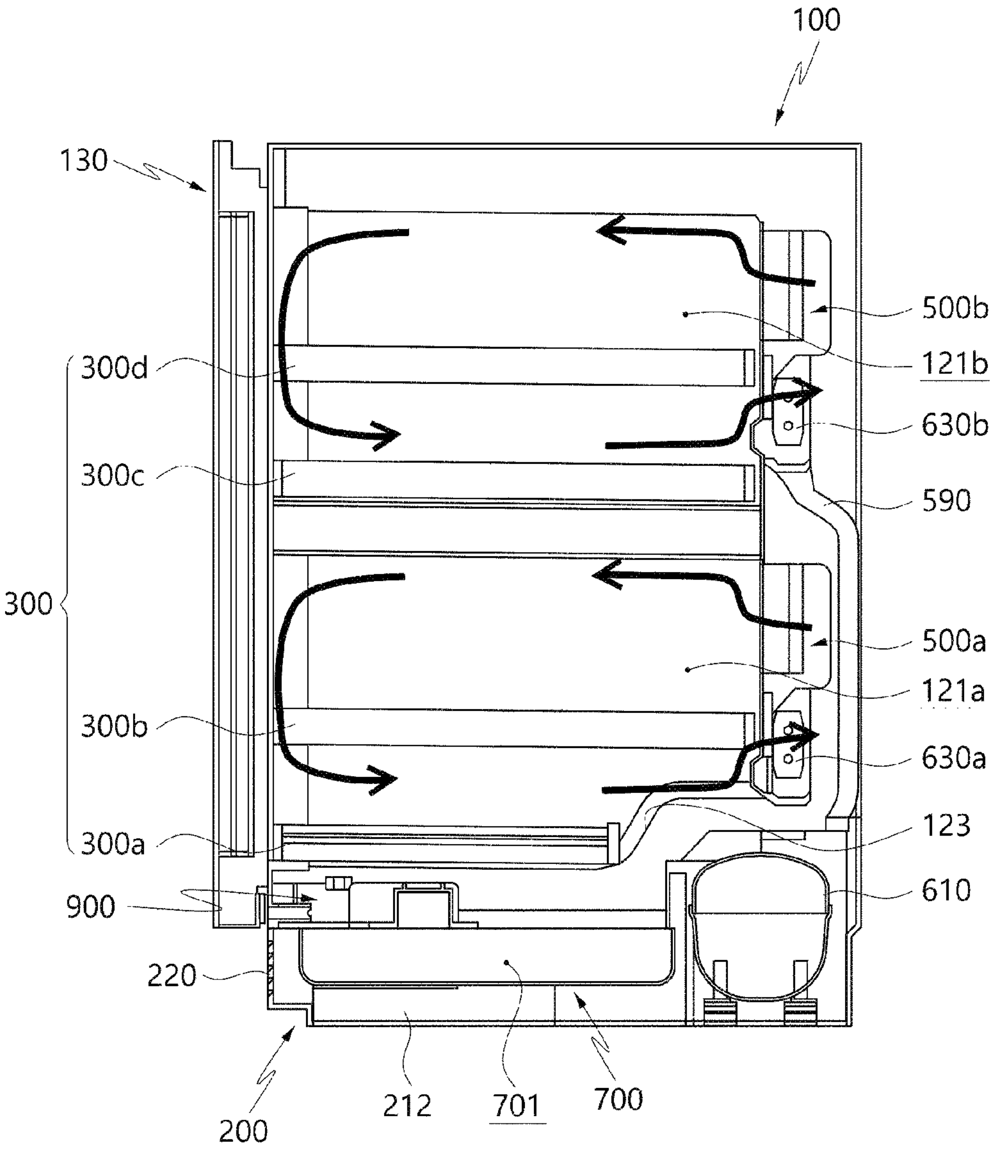
FIG. 5 is a section view taken along line I-I' in FIG. 1.

As shown in FIG. 5, the grill fan module 500*a*, 500*b* may be provided for each storage space 121 in the embodiment of the present disclosure. In other words, the grill fan modules 500*a* and 500*b* may be respectively installed in a lower storage space 121*a* and an upper storage space 121*b* that are partitioned by the barrier 400.

Next, the air conditioning module 600 will be described below. The air conditioning module 600 may be configured to control the temperature in the storage space 121 of the inner casing 120. The air conditioning module 600 may include the compressor 610, a main condenser 620, and an evaporator 630*a*, 630*b*. In other words, the temperature of the air circulated in the storage space 121 may be controlled by the air conditioning module 600.

The compressor 610 and the main condenser 620 may be provided in the machine room 201 of the machine room frame 200. The main condenser 620 may be positioned in an air inflow side of opposite sides partitioned by the partition 230 in the machine room frame 200, and the compressor 610 may be positioned in a portion of the machine room 201 where the air that has passed through the main condenser 620 passes. In particular, the compressor 610 may be positioned at an air discharge side.

Furthermore, the cooling fan 611 may be provided at an air inflow side of the compressor 610, allowing air to be introduced and discharged to/from the machine room 201 and cooling the compressor 610. The cooling fan 611 may serve to block a portion where the compressor 610 is positioned from the air inflow side where the main condenser 620 is positioned, so that it is possible to reduce the influence of high temperature heat of the compressor 610 on the main condenser 620.

Next, the door opening device 900 will be described below. The door opening device 900 may be installed in the center of the lower portion of the cabinet 100, and at least a portion of the door opening device 900 may selectively protrude toward the rear surface of the door assembly, so that the door opening device 900 may serve to posh the door assembly in a direction away from the cabinet 100. Accordingly, when the door opening device 900 is operated, the door assembly 130 may be opened automatically.

In the embodiment, the door opening device 900 may be installed in a portion in the lower portion of the cabinet 100, i.e. in the center of an upper portion of the machine room 201. In other words, since a bottom surface of the refrigerator is somewhat separated from the bottom of the machine room, the door opening device 900 may be positioned higher than the components installed in the machine room and may be positioned at the center of the lower portion of the cabinet 100, so that the door opening device 900 may push the center of the rear surface of the door assembly 130. In FIG. 2, reference numeral S represents a position in which the door opening device 900 is installed. Accordingly, regardless that the hinge of the door assembly 130 is positioned in the right or the left of the cabinet 100, the door opening device 900 may push the door assembly 130 precisely. Referring to FIGS. 20 to 22B, reference numeral H represents a hinge mounted portion in which the hinge 168 is installed.

Figure 20:
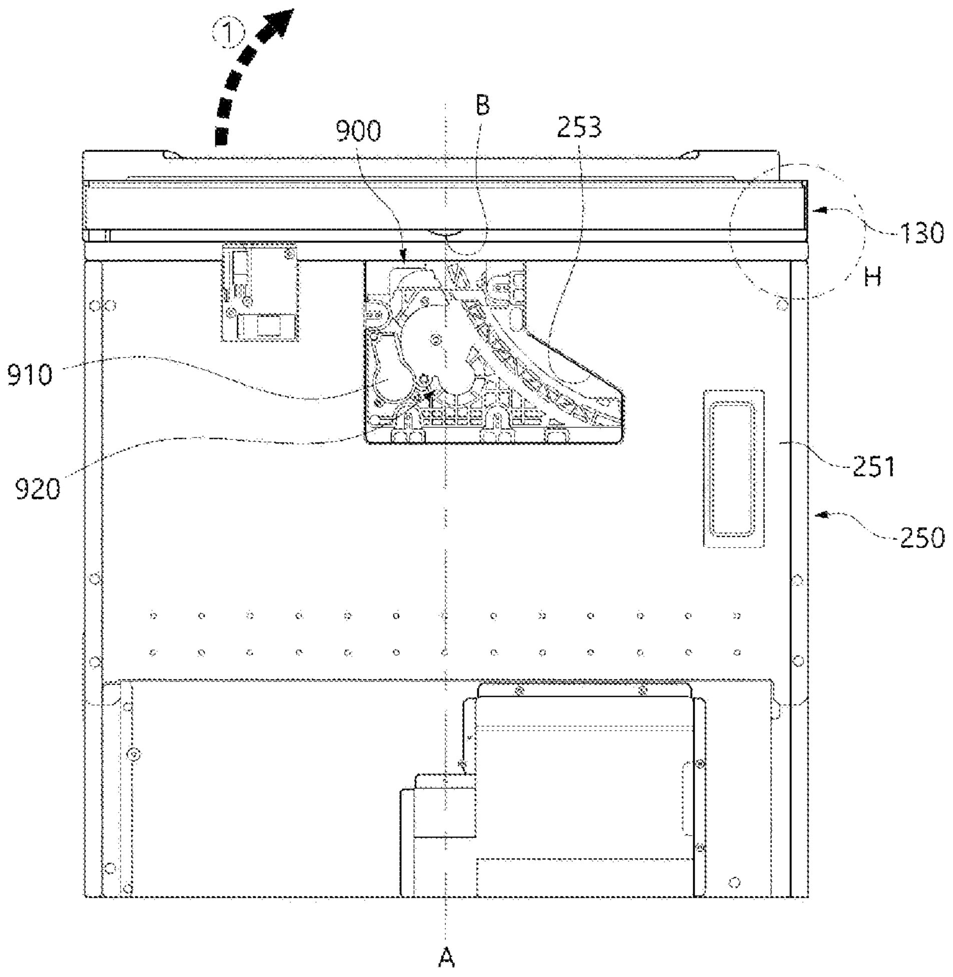
FIG. 20 is a bottom view showing the door opening device in an installed state to the cover plate of the refrigerator according to the embodiment of the present disclosure.
Figure 21:
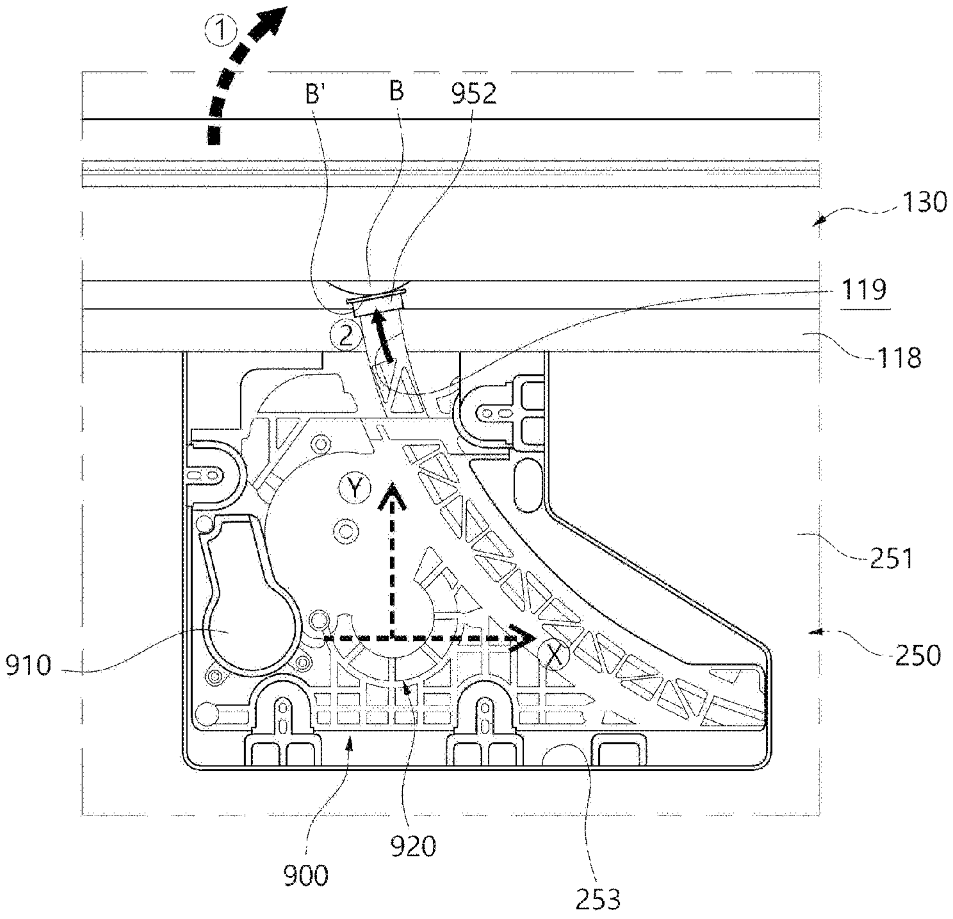
FIG. 21 is an enlarged-bottom view showing a configuration of the door opening device of the refrigerator according to the embodiment of the present disclosure.

Referring to FIG. 20, in the case in that the hinge mounted portion H is positioned in the right side based on the drawing, when the push rod 950 pushes the door assembly 130, a direction of rotation of the door assembly 130 (clockwise) and a direction in which the push rod 950 protrudes and is rotated (clockwise) may be the same as each other. Therefore, even when the door assembly 130 is rotated, a rod cap 952 of the push rod 950 may maintain a state in close contact with the contact portion B.

According to the embodiment, the door opening device 900 may be arranged in the center portion of the cover plate 250, and the rod cap 952 may be operated while being stably in contact with the contact portion B. Therefore, regardless of a position of the hinge mounted portion H, the door opening device 900 may push the door assembly 130 precisely.

More precisely, the door opening device 900 may be installed in the installation space 253 that is depressed toward the storage space 121 from the lower portion of the cabinet 100. The installation space 253 may have a shape in which the lower portion of the cabinet 100 is partially depressed, the installation space 253 may be formed in the cover plate 250 in the embodiment. In other words, the cover plate 250 may be installed between an upper portion of the machine room frame and the lower portion of the cabinet 100 to cover the machine room, and the door opening device 900 may be received in the installation space 253 that is depressed from a lower surface 251 of the cover plate 250 toward the lower portion of the cabinet 100.

The cover plate 250 may be spaced apart from the inner casing 120 to form a foam space therebetween, so that the foaming agent may be filled into the foam space through an upper portion thereof to form an insulation portion. Therefore, the installation space 253 may be depressed toward the insulation portion and does not interfere with other components. In addition, the insulation portion may be filled in the periphery of the cover plate 250 surrounding the door opening device 900, and the insulation portion may serve as a sound insulation material that blocks noise of a motor or a gear generated in the door opening device 900.

Figure 19:
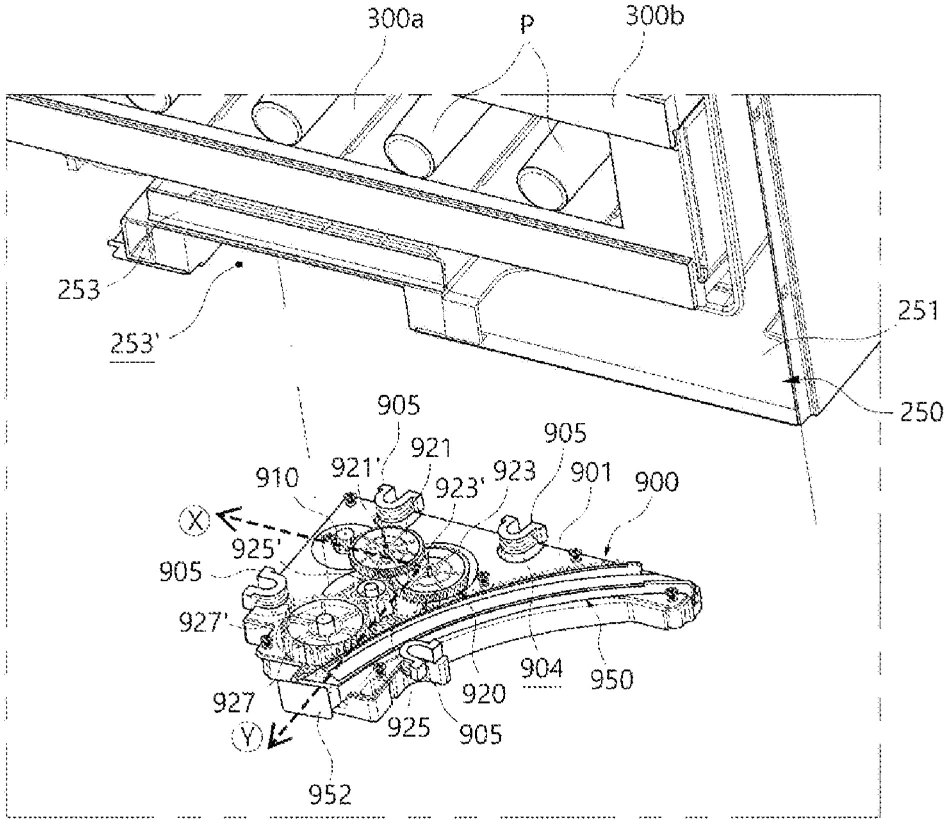
FIG. 19 is a perspective view showing a door opening device in a separated state from a cover plate of the refrigerator according to the embodiment of the present disclosure.

Referring to FIGS. 19 and 20, the installation space 253 may be formed inside a depression that is depressed from the cover plate 250 toward the bottom of the inner casing 120. The installation space 253 may be positioned in the center of the cover plate 250, and the installation space 253 may have an open lower surface facing the machine room and an open front surface facing the door assembly 130. In other words, the installation space 253 may be a space connected to the machine room.

Whereby, when the machine room assembly is separated from the refrigerator, the door opening device 900 installed in the installation space 253 and the installation space 253 may be exposed to the outside of the refrigerator to facilitate maintenance. In FIG. 20, the machine room assembly of the refrigerator is removed, and the bottom side of the refrigerator is exposed. In the drawing, the installation space 253 and the door opening device 900 installed in the installation space 253 is exposed to the outside.

In addition, the front surface of the installation space 253, which faces the door assembly 130, may be opened. In FIG. 19, a front entrance 253' of the installation space 253 is exposed outward. The front surface of the installation space 253 may be shielded by the front frame 118 constituting the cabinet 100, and the front frame 118 may have a rod entrance 119 for the push rod 950 protruding from the door opening device 900.

Accordingly, the front surface of the installation space 253 may be shielded by the front frame 118, and a portion where the push rod 950 enters and exits may be pierced in a hole shape (rod entrance 119, referring to FIG. 4). Therefore, when the push rod 950 of the door opening device 900 does not protrude yet, the rod cap 952 of the push rod 950 may block the rod entrance 119 to prevent penetration of foreign matter.

Referring to FIGS. 19 to 24, the configuration of the door opening device 900 will be described below. The door opening device 900 may be installed in a device casing 901 forming an external shape thereof. In the device casing 901, a portion thereof close to the door assembly 130 may be narrow, but an inner portion of the cover plate 250 may be relatively wide. The above structure is provided for arrangement of a driving motor 910 and a gear assembly 920 installed in the device casing 901, which will again be described below.

The device casing 901 may be installed in the center of the cover plate 250. More precisely, the rod entrance 119 through which the push rod 950 protrudes may be preferably positioned on the center line of the cover plate 250. In FIG. 20, line A represents the center line of the cover plate 250.

Referring to FIG. 19, the device casing 901 may have a height corresponding to the installation space 253, and may have a thin and wide plate-shaped structure. The device casing 901 may include a plurality of components and, for example, an upper casing (not shown) and a lower casing may respectively form an upper external shape and a lower external shape of the door opening device 900. In addition, a space in which the driving motor 910 and the gear assembly 920 are arranged may be provided by coupling between the upper casing and the lower casing. In the drawing, in order to expose the driving motor 910 and the gear assembly 920, the device casing 901 is shown in a state without the upper casing. Of course, the upper casing may be omitted and the device casing 901 may be configured only of the lower casing.

The device casing 901 may have a plurality of installation rings 905 outside the device casing 901. Each of the installation rings 905 may be inserted in a ring installation groove 904 that is recessed on an edge of the device casing 901, and the installation rings 905 may be made of silicon so as to support the lower casing to be seated on the inside of the ring installation groove 904 of the device casing 901. Accordingly, the refrigerator may have a structure in which vibration generated when the door opening device 900 is operated is reduced and noise caused thereby is prevented.

The installation rings 905 may be pierced by separate fasteners and be fixed to the upper casing. In the embodiment, each of the installation rings 905 may not be formed in a completely closed curve, but may be formed in a shape having an open side, and with having the shape, the amount of elastic deformation may be larger. Each of the installation rings 905 may be improved in fastening force when the fastener passes through the installation ring that have been forcibly fitted in the ring installation groove 904.

The device casing 901 may have the driving motor 910. The driving motor 910 may be mounted on a lower surface of the device casing 901. The driving motor 910 may be a brushless DC (BLDC) motor capable of normal and reversal rotation. The BLDC-type driving motor 910 may count a frequency generating (FG) signal to control the speed of the driving motor 910 variably.

Accordingly, shock occurring when the door assembly 130 is opened and closed may be reduced by controlling the speed of the door opening device 900 during the operation of the door opening device 900. Furthermore, the push rod 950 may perform emergency return in case of emergency. The driving motor 910 may be mounted on a lower surface of the lower casing and a rotation shaft of the driving motor 910 may pierce into the inside of the lower casing.

The device casing 901 may have the driving motor 910, and a pinion gear 911 of the driving motor 910 may protrude to be rotated by the driving motor 910. The pinion gear 911 may be engaged with the gear assembly 920 to rotate the gear assembly 920. More specifically, a plurality of gears may be arranged to be engaged with each other in the device casing 901, the plurality of gears may include a reduction gear 921, 923 and a spacer gear 925, 927. The reduction gear 921, 923 may serve reduce the rotation speed of the driving motor 910 by a gear ratio, and the spacer gear 925, 927 may be engaged with the reduction gear 921, 923 and may serve to fill an empty space between the push rod 950 and the reduction gear 921, 923.

In other words, the reduction gear 921, 923 may reduce the rotation speed to transmit power for driving the push rod 950. The spacer gear 925, 927 may be provided to secure a distance required for ejection of the push rod 950, and may move a contact position with the push rod 950 by being engaged with the spacer gear 925, 927. Of course, instead of the above configuration, the spacer gear 925, 927 may also be configured as part of the reduction gear 921, 923, which is responsible for the deceleration function.

The pinion gear 911 of the driving motor 910 may be connected to a first reduction gear 921. The first reduction gear 921 may be a gear that is combined with the pinion gear 911 with the highest rotation speed, and may have high probability of noise. Therefore, the pinion gear 911 and the first reduction gear 921 may be made of an elastomer material having excellent mechanical strength, elastic recovery, and high heat resistance. Therefore, the pinion gear 911 and the first reduction gear 921 satisfy a desired mechanical strength and may reduce the noise generated between the pinion gear 911 and the first reduction gear 921. The rest of the gears may be made of engineering plastic (plastic outperforming metal, POM) material. Of course, all gears may be made of the same material or made of material other than the above examples.

The first reduction gear 921 may be connected to a second reduction gear 923, and the second reduction gear 923 may be connected to the spacer gear 925, 927. The reduction gear 921, 923 may have a structure in which an input side and an output side are placed in vertical two steps like the typical reduction gear 921, 923, and may be configured such that the input side and the output side are in contact with adjacent gears to reduce the rotation speed.

The number of rotation may be controlled through combination of the plurality of reduction gears 921 and 923, and the power transmitted to the push rod 950 may be controlled through the control of the number of rotation. Of course, the number of the reduction gears 921 and 923 may be controlled according to the need of the air conditioning module 600. In the embodiment, the reduction gear 921, 923 may include two reduction gears, but may include three reduction gears or more. Reference numerals 921' and 923' represent rotation shafts of the first reduction gear 921 and the second reduction gear 923.

A first spacer gear 925 may be arranged at the second reduction gear 923, and the first spacer gear 925 and the push rod 950 may be connected to each other by a second spacer gear 927. The spacer gear 925, 927 may have a general flat gear shape, and may be configured to simply transmit the power of the second reduction gear 923 to the push rod 950 and to adjust a contact distance between the space gear and the push rod 950 to secure the maximum ejection distance of the push rod 950. For the above purpose, the spacer gear 925, 927 may include a plurality of gears with different sizes.

A position of the contact between the spacer gear 925, 927 and the push rod 950, which is provided for transmitting the power to the push rod 950, may be preferably arranged in an ejected direction of the push rod 950 as much as possible, and should be positioned adjacent to the rear surface of the door assembly 130. In order to achieve the above structure, the spacer gear 925, 927 may be arranged between the second reduction gear 923 and the push rod 950. Reference numerals 925' and 927' represents rotation shafts of the first spacer gear 925 and the second spacer gear 927.

More specifically, the reduction gears 921 and 923 and the spacer gears 925 and 927 that constitute the gear assembly 920 of the door opening device 900 may be arranged in different directions. Referring to FIG. 19, a direction X in which the plurality of the reduction gears 921 and 923 extend from the driving motor 910 of the door opening device 900 and a direction Yin which the plurality of the spacer gears 925 and 927 extend from the reduction gears 921 and 923 may be different from each other.

In the embodiment, the direction X in which the plurality of reduction gears 921 and 923 constituting the gear assembly 920 of the door opening device 900 extends from the driving motor 910 of the door opening device may be arranged perpendicularly to the direction in which the push rod 950 of the door opening device is ejected and retracted.

The direction Yin which the plurality of spacer gears 925 and 927 extends from the reduction gears 921 and 923 may be arranged in parallel to the ejected and retracted direction of the push rod 950.

As described above, when the extending direction Y of the spacer gears 925 and 927 is arranged in parallel to the ejected and retracted direction of the push rod 950, the contact point at which the second spacer gear 927 is engaged with the push rod 950 may be arranged as close to the rod entrance 119 as much as possible, thereby ensuring the maximum ejection distance of the push rod 950. At the same time, as the arrangement direction of the reduction gear 921, 923 and the arrangement direction of the spacer gear 925, 927 are different from each other, the entire length of the door opening device 900 may be prevented from being excessively increased when the gear assembly 920 extends in any direction.

The push rod 950 may open the door assembly 130 by pushing the rear surface of the door assembly 130. The push rod 950 may be mounted to the inside of the device casing 901, and may have a rack gear at an outside surface thereof so that the rack gear may be operated while being engaged with the second spacer gear 927. Therefore, the rack gear may pass through the rod entrance 119 and protrude outward by the rotation of the spacer gear 925, 927. Due to the position of the second spacer gear 927, at least half of the rack gear may be ejected from the device casing 901 when the push rod 950 is operated by the second spacer gear 927.

In the embodiment, the push rod 950 may have an arc shape with a predetermined curvature. Therefore, the push rod 950 may maintain a state in contact with a constant point of the rear surface of the door assembly 130, more precisely, with the contact portion B in the situation in which the door assembly 130 is rotated. Accordingly, even when the door assembly 130 is rotated, the push rod 950 may push a constant point of the door assembly 130 without slipping to open the door assembly 130.

A rotated direction of the push rod 950 may be the same as a rotated direction of the door assembly 130. Referring to FIG. 20, the hinge is positioned in the right side of the cover plate 250 based on the drawing, thus the door assembly 130 may be rotated counterclockwise. The push rod 950 may also be rotated counterclockwise during the protruding process. In the above case, the rotated direction (arrow ①) of the door assembly 130 and the rotated direction of the push rod 950 during the protruding process may be the same as each other. Therefore, even when the door assembly 130 is rotated, the rod cap 952 of the push rod 950 may maintain a state in close contact with the contact portion B.

The rod cap 952 may be provided in a front end of the push rod 950. The rod cap 952 may be made of an elastic material such as silicon or rubber, and may be in contact with the door assembly 130 to prevent the noise generated from the contact between the push rod 950 and the door assembly 130 and to increase a grip force so that power of the push rod 950 pushing the door assembly 130 may be efficiently transmitted to the door assembly 130.

In the embodiment, a front surface of the rod cap 952 facing the rear surface of the door assembly 130 is wider than the end of the push rod 950 so as to stably push a surface B' of the contact portion B. The rod cap 952 may have the rectangular-shaped front surface.

Meanwhile, although not shown in the drawings, a switch magnet may be provided in the rod cap 952. The switch magnet may be provided for detecting the degree of opening of the door assembly 130, and may operate a reed switch (not shown) installed in the contact portion B. In other words, the reed switch may be provided in the contact portion B of the door assembly 130, thereby maintaining a fixed position even when the door assembly 130 is rotated. The switch magnet may be rotated in a state in contact with the door assembly 130 during rotation of the door assembly 130.

Therefore, when the door assembly 130 is pushed by the push rod 950, that is, the rod cap 952 is in contact with the contact portion B, the reed switch may be maintain in an 'On' state by the switch magnet. For example, the reed switch may be maintain the 'On' state from a state in which the door assembly 130 is closed to a state in which the door assembly 130 is pushed by the push rod 950 and automatically opened by a predetermined angle.

In the state in which the door assembly 130 is automatically opened by the predetermined angle, when the user further rotates the door assembly 130 to open the door assembly 130, the switch magnet of the rod cap 952 and the reed switch embedded in the contact portion B of the door assembly 130 are detached from each other so that the reed switch is turned to an 'Off' state. In this state, the control module 700 detects that the user has further opened the door assembly 130 and operates the door opening device 900 to control the push rod 950 to return to its original position. Conversely, of course, the state in which the rod cap 952 is in contact with the contact portion B may be the 'Off' state and the separation state may be the 'On' state.

Figure 22A:
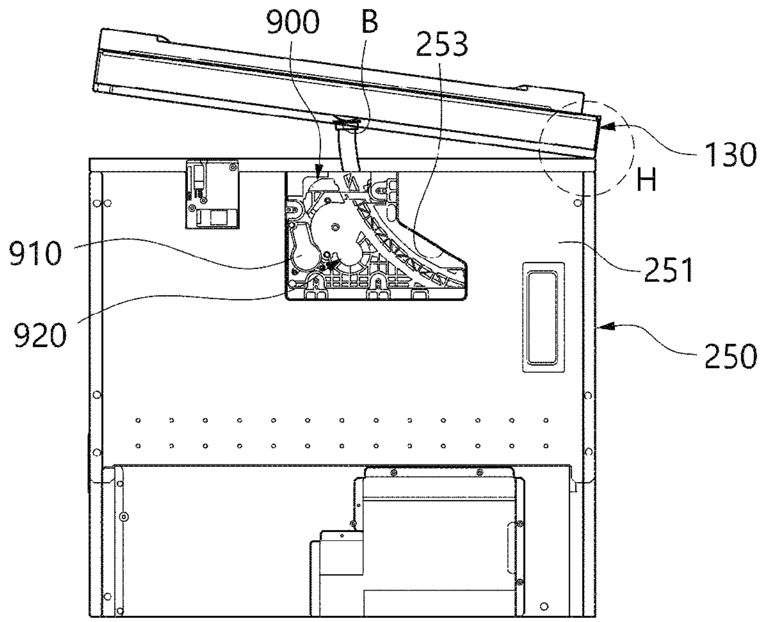
FIGS. 22A and 22B are views showing an example in which a door of the refrigerator is sequentially opened by the door opening device according to the embodiment of the present disclosure.
Figure 22B:
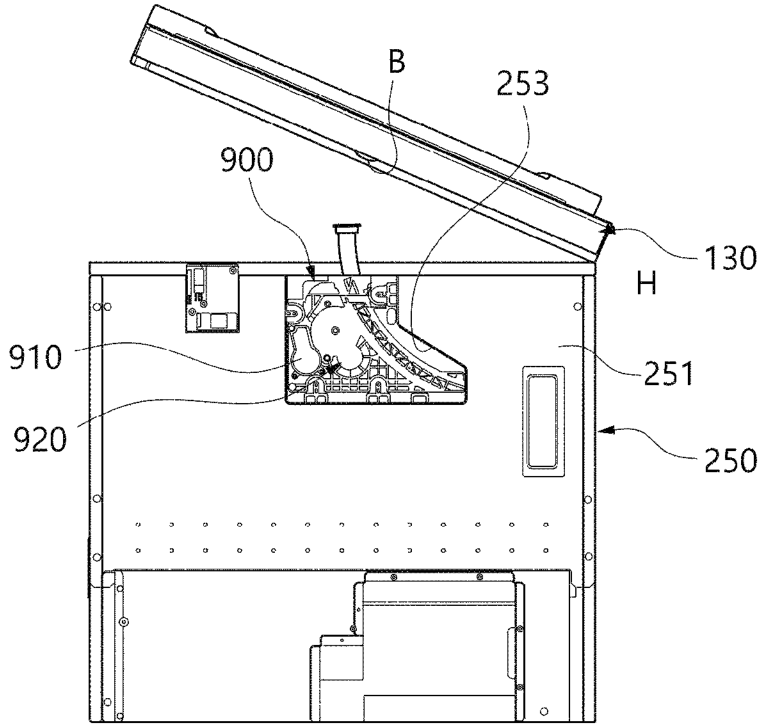
Figure 23:
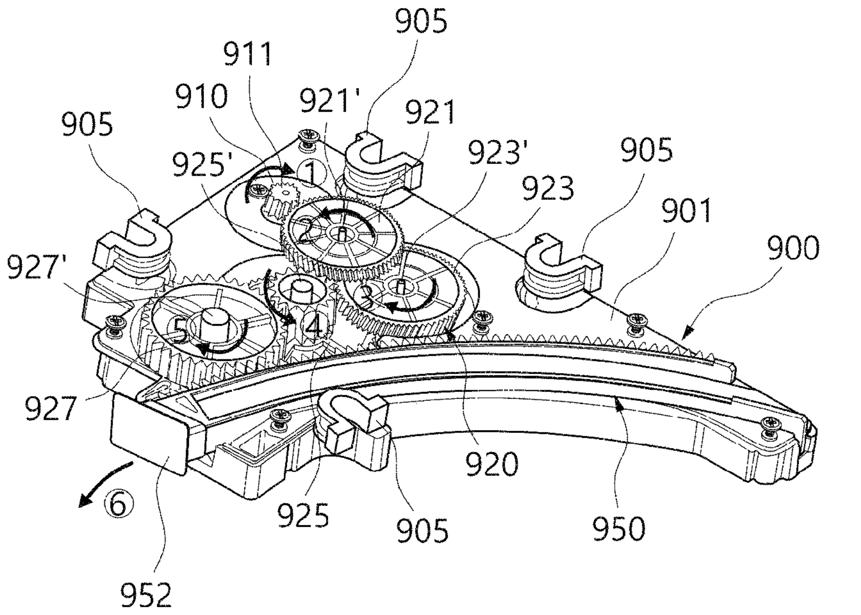
FIG. 23 is a perspective view showing the door opening device in a state before a push rod protrudes according to the embodiment of the present disclosure.
Figure 24:
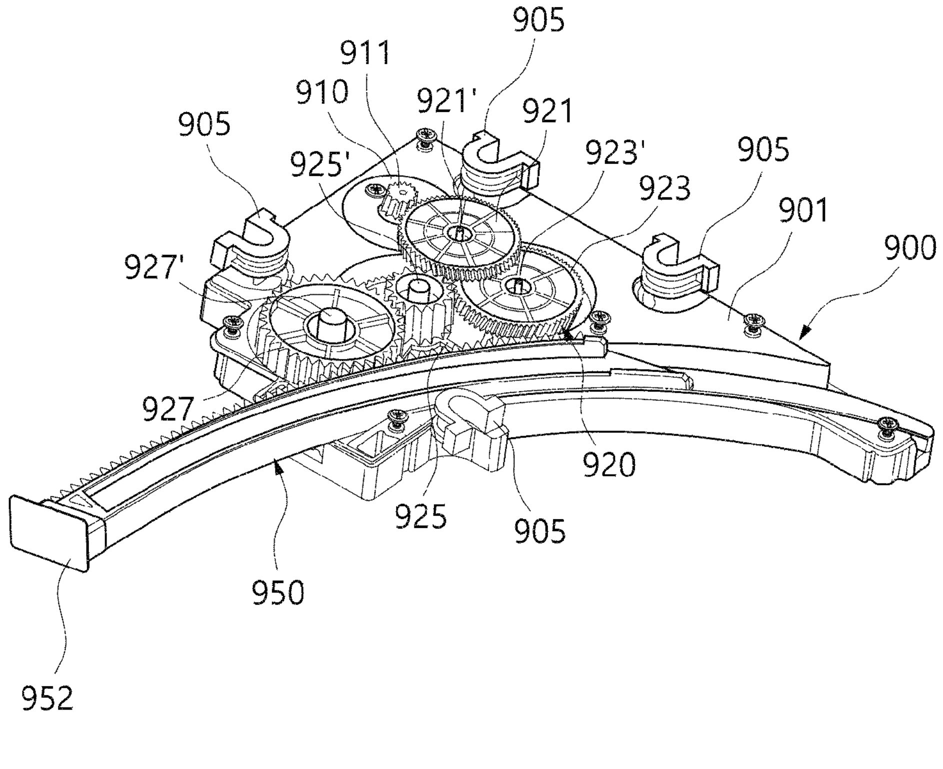
FIG. 24 is a perspective view showing the door opening device with the protruding push rod according to the embodiment of the present disclosure.

Meanwhile, the control module 700 may detect that the user further opens the door assembly 130 and operate the door opening device 900 to control the push rod 950 to return to its original position, and at the same time, when the control module 700 detects that the user further opens the door assembly 130, the control module 700 may turn on an inside lighting so that the storage space 121 is clearly visible. Referring to FIG. 22A, the state in which the door assembly 130 is pushed by the push rod 950 of the door opening device 900 and opened is shown in the drawing, and FIG. 22B shows the state in which the door assembly 130 is further opened by the user.

In the embodiment, the push rod 950 of the door opening device 900 may push and rotate the door assembly 130 so that an angle between the door assembly 130 and the front surface of the cabinet 100 may be within a range of 5° to 15°. In this case, it is possible to prevent infants and children from being injured due to the excessively opened door assembly 130 of the refrigerator. When the door assembly 130 is rotated over the predetermined angle, the reed switch may be turned to the 'Off' state, and the control module 700 may rotate the driving motor 910 of the door opening device 900 in a direction opposite to the open direction to return the push rod 950 to its original position.

Figure 25B:
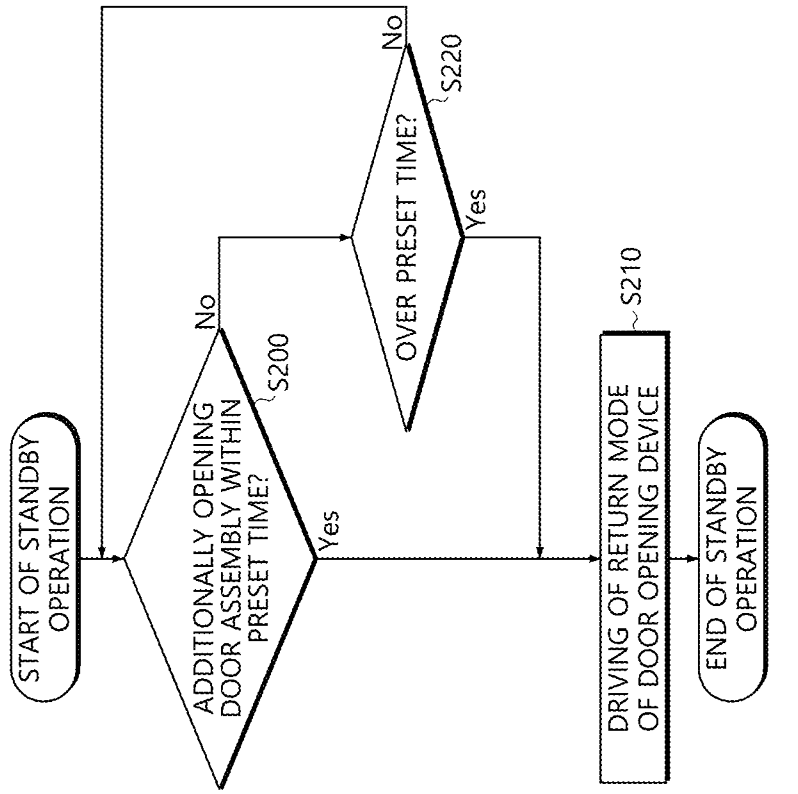
FIGS. 25A and 25B are flowcharts sequentially showing an opening process and a standby operation of the door assembly when the operation module and the door opening device according to the embodiment of the present disclosure are controlled.
Figure 25A:
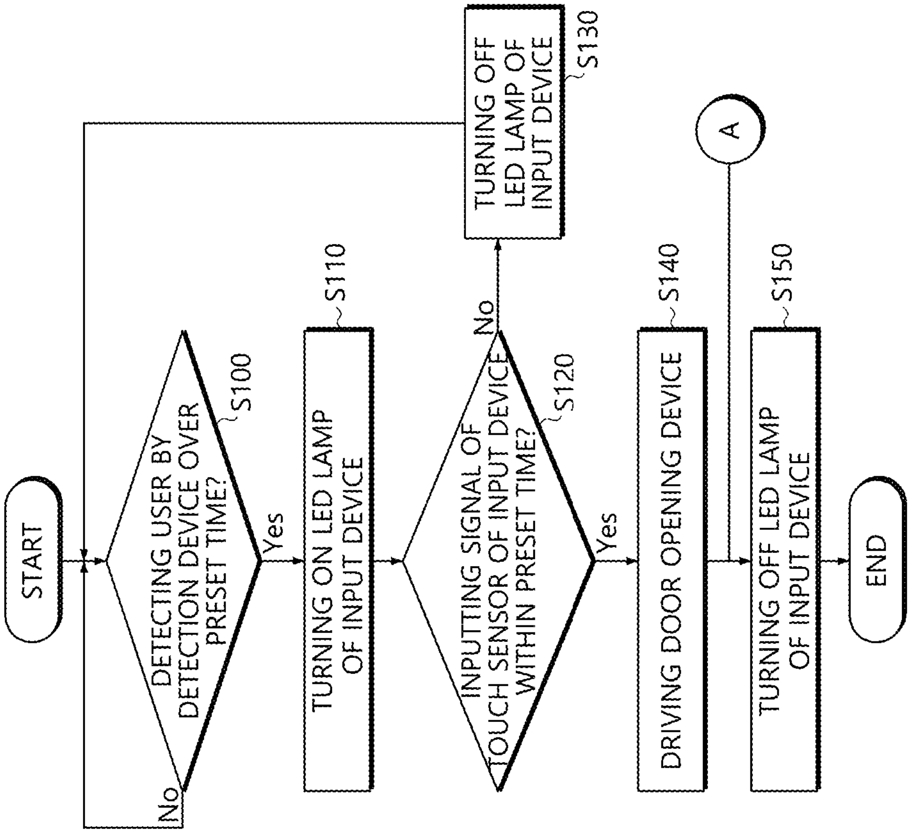

Referring to FIGS. 25A and 25B, a control process of the door opening device 900 will be described. First, in FIG. 25A, a normal door opening operation is shown in order. As shown in the drawing, when the user stands in front of the door assembly 130, the detection device 175 may detects the approach of the user. The position of the user may be recognized when the light emitting portion of the detection device 175 emits infrared rays and the receiving light portion measures an angle of reflected light.

When the detection device 175 recognizes the user for more than a preset time, the detection device 175 may assume that the user is willing to user the refrigerator (S100). Herein, the preset time may be within a range of 2 to 8 seconds. When the user leaves from the front of the door assembly 130 before the preset time, the detection device 175 may recognize the user's absence, the detection device 175 may enter an initial state without moving to a next step.

When the detection device 175 recognizes the user for more than the preset time, the LED lamp 172 of the input device 170 may be turned on (S110). Herein, since the LED lamp 172 is positioned directly above the touch sensor 173 constituting the input device 170, the user can precisely press the touch sensor 173 by looking at a position where the LED lamp 172 emits light.

When the user manipulates the touch sensor 173 within a preset time (S120), the door opening device 900 may be operated (S140). When the user does not manipulate the touch sensor 173 within the preset time, the LED lamp 172 is turned off and enters the initial state thereof (S130). Of course, when the movement of the user is detected on the way, the LED lamp 172 may be turned to the 'On' state. At this time, the preset time may be preset to be relatively longer than the previous described preset time, for example, may be preset as a range of 5 to 15 seconds.

Lastly, after the door assembly 130 is opened, the LED lamp 172 is turned off. At this time, in a state in which the door assembly 130 is automatically opened by the door opening device 900 by the predetermined angle, when the user further rotates and opens the door assembly 130 as shown in FIG. 22B (S200), the switch magnet of the rod cap 952 and the reed switch embedded in 의 the contact portion B of the door assembly 130 may be detached from each other so that the switch magnet may be turned to the 'Off' state.

In this state, the control module 700 may detect that the user further opens the door assembly 130 to and operate the door opening device 900 to control the push rod 950 to be return to the its original position (S210). Conversely, of course, the state in which the rod cap 952 is in contact with the contact portion B may be the 'Off' state and the separation state may be the 'On' state.

The control module 700 may detect that the user further opens the door assembly 130 and operate the door opening device 900 to control the push rod 950 to return to its original position, and at the same time, when the control module 700 detects that the door assembly 130 is opened the user, the control module 700 may turn on the inside lighting so that the storage space 121 is clearly visible.

When the door assembly 130 is automatically opened by the door opening device 900 by the predetermined angle and the user does not further rotate and open the door assembly 130 for more than the preset time, the door assembly 130 may be closed again and be in the standby operation state (S220). When the driving motor 910 of the door opening device 900 is rotated in reverse, the door assembly 130 may be closed while the push rod 950 may return, and at this time, the door assembly 130 may be closed by the tension of the hinge 168.

Although the preferred embodiment of the present disclosure has been described for illustrative purposes, those skilled in the art will appreciate that various modifications, additions and substitutions are possible, without departing from the scope and spirit of the present disclosure as disclosed in the accompanying claims. Therefore, the preferred embodiment described above has been described for illustrative purposes, and should not be intended to limit the technical spirit of the present disclosure, and the scope and spirit of the present disclosure are not limited to the embodiments. The protective scope of the present disclosure should be interpreted by the accompanying claims, and all technical spirits within the equivalent scope should be interpreted as being included in the scope and spirit of the present disclosure.

What is claimed is:

1. A refrigerator comprising:

a cabinet that defines a storage space;

a door assembly rotatably coupled to the cabinet and configured to open and close at least a portion of the storage space;

a machine room assembly that is positioned below the cabinet and defines a machine room therein; and a door opening device disposed at a lower portion of the cabinet and configured to protrude toward a rear surface of the door assembly to thereby push a lower part of the door assembly in a direction away from the cabinet, wherein the door opening device is arranged in an installation space recessed from the lower portion of the cabinet toward the storage space, the installation space being recessed upward relative to the machine room assembly and defined above the machine room, wherein the refrigerator further comprises a cover plate that is disposed between an upper portion of the machine room assembly and the lower portion of the cabinet, the cover plate defining the installation space in which the door opening device is arranged, wherein the installation space has (i) a lower surface that is open toward the machine room and (ii) a front surface that is open toward the door assembly and shielded by a front frame of the cabinet, and wherein the front frame has an inlet of a push rod protruding from the door opening device.

2. The refrigerator of claim 1, wherein the installation space has a front entrance that is opened toward the rear surface of the door assembly.

3. The refrigerator of claim 1, wherein the installation space is open toward the machine room.

4. The refrigerator of claim 1, wherein the cover plate covers the machine room, and wherein the door opening device is arranged in the installation space that is recessed from a lower surface of the cover plate toward the lower portion of the cabinet.

5. The refrigerator of claim 1, wherein the cover plate covers the machine room, and wherein a control module is positioned on a lower surface of the cover plate to be electrically connected to the door opening device.

6. The refrigerator of claim 5, wherein the control module is positioned on the lower surface of the cover plate, and when the cabinet and the machine room assembly are combined, the control module is positioned inside the machine room.

7. The refrigerator of claim 5, wherein the control module is positioned close to a side of the machine room and adjacent to an outlet of the machine room, and the door opening device is positioned higher than the control module from a bottom of the machine room.

8. The refrigerator of claim 1, wherein the door opening device comprises:

a device casing inserted into the installation space;

a driving motor mounted on the device casing;

a gear assembly connected to the driving motor and configured to reduce and transmit rotational force of the driving motor; and the push rod configured to push the rear surface of the door assembly based on selectively protruding toward the door assembly in conjunction with the gear assembly.

9. The refrigerator of claim 1, wherein the door opening device comprises (i) the push rod that has a rack gear on a surface thereof and (ii) a gear assembly engaged with the rack gear, and wherein the push rod has an arc shape having a predetermined curvature and is configured to protrude toward the rear surface of the door assembly through rotational motion in a first rotation direction and to retract in a second rotation direction opposite to the first rotation direction and be received inside the door opening device.

10. The refrigerator of claim 9, wherein the door assembly is configured to rotate in the first rotation direction of the push rod relative to the cabinet.

11. The refrigerator of claim 8, wherein the gear assembly includes:

at least one reduction gear configured to reduce a rotation speed of the driving motor while being engaged with the driving motor; and at least one spacer gear that is engaged with the at least one reduction gear and connected to the push rod, the at least one spacer gear being configured to transmit the rotational force of the driving motor to the push rod.

12. The refrigerator of claim 1, wherein the door opening device comprises a driving motor and a gear assembly, wherein the gear assembly comprises:

a plurality of reduction gears that extend from the driving motor in a first direction, and a plurality of spacer gears that extend from the plurality of reduction gears in a second direction different from the first direction.

13. The refrigerator of claim 8, wherein the door opening device further comprises a rod cap that is assembled at a most protruding end of the push rod, and wherein a front surface of the rod cap toward the rear surface of the door assembly is wider than an end of the push rod.

14. The refrigerator of claim 1, wherein the door opening device is arranged on a lower center portion of the cabinet.

15. The refrigerator of claim 1, further comprising:

a reed switch that is provided at a portion of the rear surface of the door assembly configured to be in contact with an end of the push rod of the door opening device; and a switch magnet that is embedded at the end of the push rod, wherein the reed switch is configured to be turned on or off based on the end of the push rod being spaced apart from the rear surface of the door assembly.

16. The refrigerator of claim 1, further comprising a detection device that is disposed at the door assembly, wherein, when the detection device detects a user in front of the door assembly, an operation module to which the detection device is connected controls an opening operation of the door opening device or operates a light emitting portion of the door assembly.

17. The refrigerator of claim 16, wherein the detection device is arranged at a center of an upper portion of the door assembly.

18. The refrigerator of claim 1, wherein the door assembly further comprises a hinge and an input device disposed on a side opposite to where the hinge is arranged, and wherein the input device is connected to an operation module that is configured to, based on an input signal being applied to the input device, drive an opening operation of the door opening device.

19. A refrigerator comprising:

a cabinet that defines a storage space;

a door assembly rotatably coupled to the cabinet and configured to open and close at least a portion of the storage space;

a machine room assembly that is positioned below the cabinet and defines a machine room accommodating a condenser and a compressor therein;

a cover plate that is disposed between an upper portion of the machine room assembly and a lower portion of the cabinet and covers the machine room, the cover plate defining an installation space that is recessed toward the storage space and that is defined at a center of a front surface of the cover plate facing a rear surface of the door assembly, the installation space being recessed upward relative to the machine room assembly and defined above the machine room; and a door opening device that is disposed in the installation space and configured to protrude toward the rear surface of the door assembly to thereby rotate the door assembly by pressing a lower part of the rear surface of the door assembly.

* * * * *